US011960925B2

(12) United States Patent
Mizuno et al.

(10) Patent No.: US 11,960,925 B2
(45) Date of Patent: Apr. 16, 2024

(54) PROGRAM GENERATING DEVICE, PROGRAM GENERATING METHOD, AND INFORMATION STORAGE MEDIUM

(71) Applicant: Kabushiki Kaisha Yaskawa Denki, Kitakyushu (JP)

(72) Inventors: Naoki Mizuno, Kitakyushu (JP); Yosuke Kamiya, Kitakyushu (JP); Shinichiro Obata, Kitakyushu (JP); Aya Matsunaga, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 685 days.

(21) Appl. No.: 17/118,501

(22) Filed: Dec. 10, 2020

(65) Prior Publication Data
US 2021/0182101 A1 Jun. 17, 2021

(30) Foreign Application Priority Data
Dec. 16, 2019 (JP) ................. 2019-226121

(51) Int. Cl.
G06F 9/48 (2006.01)
G06F 9/30 (2018.01)
(Continued)

(52) U.S. Cl.
CPC ........ *G06F 9/4881* (2013.01); *G06F 9/30043* (2013.01); *G06F 9/3856* (2023.08); *G06F 9/451* (2018.02); *G06F 11/328* (2013.01)

(58) Field of Classification Search
CPC ........ G05B 19/056; G05B 2219/23007; G05B 2219/23011; G05B 19/0426;
(Continued)

(56) References Cited

U.S. PATENT DOCUMENTS 5,177,420 A  1/1993  Wada et al.
5,841,657 A  11/1998  Hoshino et al.
(Continued)

FOREIGN PATENT DOCUMENTS

CN  102822755 A  12/2012
CN  103069386 A  4/2013
(Continued)

OTHER PUBLICATIONS

Action dated Feb. 2, 2023, for corresponding EP Patent Application No. 20213259.3, pp. 1-7.
(Continued)

Primary Examiner — Kenneth Tang
(74) Attorney, Agent, or Firm — HEA LAW PLLC

(57) ABSTRACT

A program generating device comprising circuitry configured to: display a schedule screen, in which, for each of a plurality of processes executed in a system including a plurality of industrial devices, at least a name of a process is associated with a variable that is at least either referenced or changed in a process program representing an operation of one or more of the plurality of industrial devices and executed in the process, a plurality of names of the plurality of processes obtained from a process database that is stored as process information are included, and an execution order of the plurality of processes can be specified; receive a specification of the execution order on the schedule screen; and generate a system program based on the execution order and the variable of each process included in the execution order.

20 Claims, 20 Drawing Sheets

(51) Int. Cl.
*G06F 9/38* (2018.01)
*G06F 9/451* (2018.01)
*G06F 11/32* (2006.01)

(58) Field of Classification Search
CPC ...... G05B 19/0423; G05B 2219/25257; G06F 9/4881; G06F 9/30043; G06F 9/3856; G06F 9/451; G06F 11/328
See application file for complete search history.

(56) References Cited

U.S. PATENT DOCUMENTS

| | | | |
|---|---|---|---|
| 6,161,051 A | 12/2000 | Hafemann et al. | |
| 6,943,795 B1 | 9/2005 | Matsui et al. | |
| 2002/0120921 A1* | 8/2002 | Coburn | G05B 19/41885 703/21 |
| 2004/0057076 A1 | 3/2004 | Hirose et al. | |
| 2005/0034106 A1* | 2/2005 | Kornerup | G06F 11/323 714/E11.181 |
| 2011/0022198 A1* | 1/2011 | Plache | G05B 19/41845 700/86 |
| 2011/0128291 A1 | 6/2011 | Miyazawa et al. | |
| 2013/0044115 A1 | 2/2013 | Oyama et al. | |
| 2013/0144409 A1 | 6/2013 | Kushiro et al. | |
| 2013/0338797 A1* | 12/2013 | Nagata | G05B 15/02 700/9 |
| 2014/0018939 A1* | 1/2014 | Ota | G06F 9/52 700/19 |
| 2014/0108996 A1* | 4/2014 | Maekawa | G06F 3/04883 715/781 |
| 2014/0114476 A1* | 4/2014 | Maeda | B25J 9/1682 700/248 |
| 2014/0129002 A1* | 5/2014 | Brandes | G05B 19/0426 700/83 |
| 2014/0236317 A1* | 8/2014 | Nagata | G05B 19/416 700/63 |
| 2014/0306642 A1* | 10/2014 | Kaku | H02P 31/00 318/568.1 |
| 2014/0309751 A1* | 10/2014 | Nagata | G05B 19/409 700/12 |
| 2015/0045958 A1* | 2/2015 | Nagata | G05B 19/416 700/275 |
| 2015/0227348 A1* | 8/2015 | Fuchikami | G06F 8/41 717/114 |
| 2015/0287318 A1* | 10/2015 | Nair | G06Q 10/10 340/5.6 |
| 2016/0018809 A1* | 1/2016 | Mizuno | G05B 19/056 700/87 |
| 2016/0075019 A1* | 3/2016 | Tabuchi | G05B 19/41865 700/252 |
| 2016/0231733 A1 | 8/2016 | Nagatani et al. | |
| 2016/0239009 A1* | 8/2016 | Mizuno | G05B 19/4063 |
| 2016/0246281 A1* | 8/2016 | Okubo | G05B 19/231 |
| 2016/0291556 A1* | 10/2016 | Shimamura | G05B 19/05 |
| 2016/0359978 A1* | 12/2016 | Chandhoke | H04L 12/403 |
| 2017/0075331 A1* | 3/2017 | Kapoor | G05B 19/0426 |
| 2017/0139390 A1* | 5/2017 | Shimoda | G05B 19/056 |
| 2018/0052451 A1* | 2/2018 | Billi-Duran | G05B 19/41835 |
| 2019/0095246 A1* | 3/2019 | Nakano | G05B 19/052 |
| 2019/0095247 A1* | 3/2019 | Shimamura | G05B 19/4145 |
| 2019/0275621 A1 | 9/2019 | Nakanishi et al. | |
| 2020/0019436 A1* | 1/2020 | Toku | G06F 9/48 |
| 2020/0125060 A1* | 4/2020 | Fujimura | G05B 19/056 |

FOREIGN PATENT DOCUMENTS

| | | |
|---|---|---|
| JP | H04-05702 A | 1/1992 |
| JP | 2012-194678 A | 10/2012 |

OTHER PUBLICATIONS

Report dated May 14, 2021, for corresponding EP Patent Application No. 20213259.3, pp. 1-10.
Office Action of Dec. 26, 2023, for corresponding CN Patent Application No. 202011433505.9 with English translation, pp. 1-33.

* cited by examiner

FIG.3
STEP 1: GENERATE PROCESS PROJECT
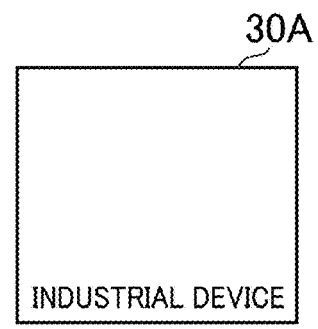
STEP 2: INITIAL SETTING OF PROCESS PROGRAM
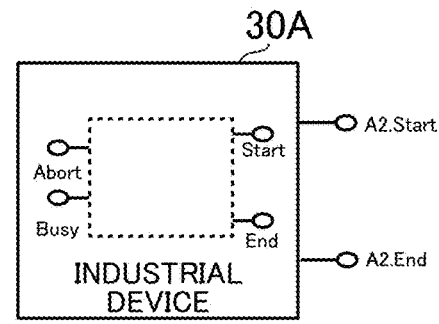
STEP 3: DETAILED SETTING OF VARIABLE ETC.
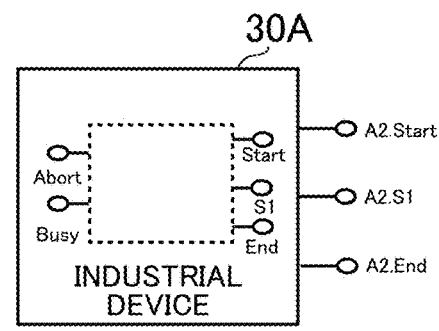
STEP 4: PROGRAMMING OF PROCESS
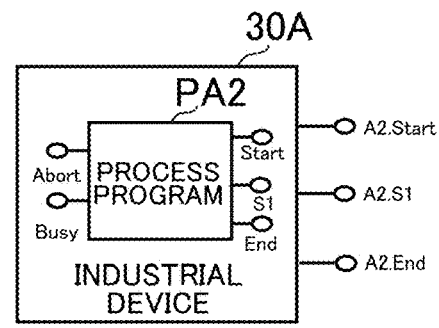

| DEVICE NAME | PROCESS NAME | ESTIMATED EXECUTION TIME | EXECUTION ORDER | PROCESS INFORMATION ||| COMMENTS |
|---|---|---|---|---|---|---|---|
| | | | | VARIABLE NAME | CONDITION ||  |
| INDUSTRIAL DEVICE 30A | PROCESS A1 | 3 | 1 | A1.Start | IO1.Input1 | | START CONDITION IS I/O SIGNAL |
| | | | | A1.Abort | A1.Err | | |
| | | | | A1.Busy | VALUE OF A1.END HAS NOT CHANGED FOR 8 SECONDS OR MORE | | |
| | | | | A1.End | LAST PROCESSING OF PROCESS PROGRAM PA1 ENDS | | |
| | PROCESS A2 | 4 | 2 | A2.Start | A1.End | | |
| | | | | A2.Abort | A2.Err | | |
| | | | | A2.Busy | VALUE OF A2.END HAS NOT CHANGED FOR 10 SECONDS OR MORE | | VARIABLE OF SIGNAL S1 HAS BEEN SET |
| | | | | A2.S1 | SIGNAL IS RECEIVED FROM SENSOR | | |
| | | | | A2.End | LAST PROCESSING OF PROCESS PROGRAM PA2 ENDS | | |
| | PROCESS A3 | 3 | 3 | A3.Start | A2.End & A2.S1 | | NOTE START CONDITION |
| | | | | A3.Abort | A3.Err | | |
| | | | | A3.Busy | VALUE OF A3.END HAS NOT CHANGED FOR 6 SECONDS OR MORE | | |
| | | | | A3.End | LAST PROCESSING OF PROCESS PROGRAM PA3 ENDS | | |
| INDUSTRIAL DEVICE 30B | PROCESS B1 | 4 | 4 | B1.Start | A3.End | | SPECIFY EXECUTION ORDER TO BE EXECUTED AFTER PROCESS A3 |
| | | | | B1.Abort | B1.Err | | |
| | | | | B1.Busy | VALUE OF B1.END HAS NOT CHANGED FOR 10 SECONDS OR MORE | | |
| | | | | B1.End | LAST PROCESSING OF PROCESS PROGRAM PB1 ENDS | | |
| | PROCESS B2 | 2 | 5 | B2.Start | B1.End | | NEXT CYCLE MAY BE STARTED BEFORE END OF PROCESS B2 |
| | | | | B2.Abort | B2.Err | | |
| | | | | B2.Busy | VALUE OF B2.END HAS NOT CHANGED FOR 6 SECONDS OR MORE | | |
| | | | | B2.End | LAST PROCESSING OF PROCESS PROGRAM PB2 ENDS | | |

FIG.14
STEP 1: DISPLAY SERIES PROGRAM SCREEN
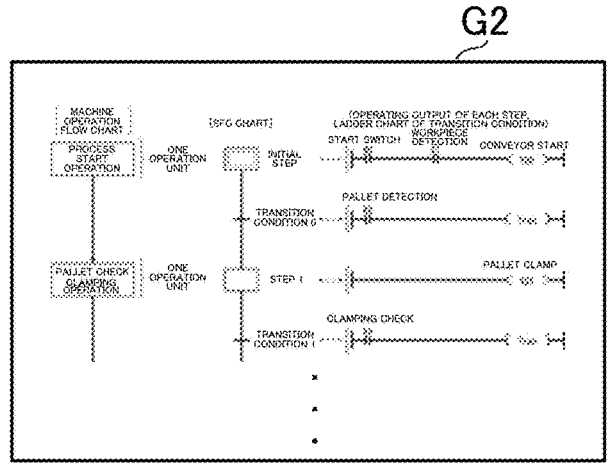
STEP 2: RECEIVE SPECIFICATION OF PART CORRESPONDING TO PROCESS PROGRAM
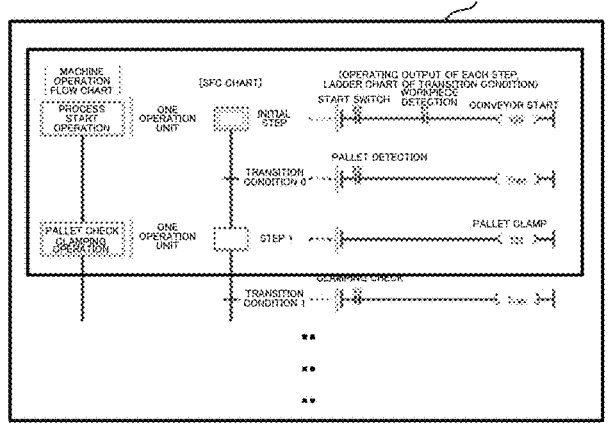
STEP 3: GENERATE NEW PROCESS PROGRAM
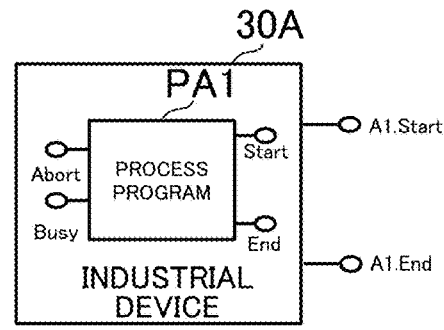

| DEVICE NAME | PROCESS NAME | ESTIMATED EXECUTION TIME | EXECUTION ORDER | PROCESS INFORMATION | | COMMENTS |
|---|---|---|---|---|---|---|
| | | | | VARIABLE NAME | CONDITION | |
| CALCULATION | CALCULATION PROCESS F | 2 | 5 | F1.Start | A2.S1 & B1.Result | CALCULATION PROCESSING IS START CONDITION OF PROCESS B2 |
| | | | | F1.End | CALCULATION PROCESSING ENDS | |
| INDUSTRIAL DEVICE 30A | PROCESS A1 | 3 | 1 | A1.Start | IO1.Input1 | START CONDITION IS I/O SIGNAL |
| | | | | A1.Abort | A1.Err | |
| | | | | A1.Busy | VALUE OF A1.END HAS NOT CHANGED FOR 8 SECONDS OR MORE | |
| | | | | A1.End | LAST PROCESSING OF PROCESS PROGRAM PA1 ENDS | |
| | PROCESS A2 | 4 | 2 | A2.Start | A1.End | |
| | | | | A2.Abort | A2.Err | |
| | | | | A2.Busy | VALUE OF A2.END HAS NOT CHANGED FOR 10 SECONDS OR MORE | VARIABLE OF SIGNAL S1 HAS BEEN SET |
| | | | | A2.S1 | SIGNAL IS RECEIVED FROM SENSOR | |
| | | | | A2.End | LAST PROCESSING OF PROCESS PROGRAM PA2 ENDS | |
| | PROCESS A3 | 3 | 3 | A3.Start | A2.End | |
| | | | | A3.Abort | A3.Err | |
| | | | | A3.Busy | VALUE OF A3.END HAS NOT CHANGED FOR 6 SECONDS OR MORE | VARIABLE OF SIGNAL S2 IS NOT START CONDITION OF OTHER PROCESS |
| | | | | A3.S2 | - | |
| | | | | A3.End | LAST PROCESSING OF PROCESS PROGRAM PA3 ENDS | |
| INDUSTRIAL DEVICE 30B | PROCESS B1 | 4 | 4 | B1.Start | A3.End | |
| | | | | B1.Abort | B1.Err | |
| | | | | B1.Busy | VALUE OF B1.END HAS NOT CHANGED FOR 10 SECONDS OR MORE | SPECIFY EXECUTION ORDER TO BE EXECUTED AFTER PROCESS A3 |
| | | | | B1.Result | MIDWAY CALCULATION OF PROCESS PROGRAM PB1 ENDS | |
| | | | | B1.End | LAST PROCESSING OF PROCESS PROGRAM PB1 ENDS | |
| | PROCESS B2 | 2 | 6 | B2.Start | B1End & F1.End | |
| | | | | B2.Abort | B2.Err | NEXT CYCLE MAY BE STARTED BEFORE END OF PROCESS B2 |
| | | | | B2.Busy | VALUE OF B2.END HAS NOT CHANGED FOR 8 SECONDS OR MORE | |
| | | | | B2.End | LAST PROCESSING OF PROCESS PROGRAM PB2 ENDS | |

FIG.17

PROGRAM GENERATING DEVICE, PROGRAM GENERATING METHOD, AND INFORMATION STORAGE MEDIUM

CROSS-REFERENCE TO RELATED APPLICATION

The present disclosure contains subject matter related to that disclosed in Japanese Patent Application JP2019-226121 filed in the Japan Patent Office on Dec. 16, 2019 the entire contents of which are hereby incorporated by reference.

BACKGROUND OF THE INVENTION

1. Field of the Invention

The embodiments disclosed herein relate to a program generating device, a program generating method, and an information storage medium.

2. Description of the Related Art

There has been known a technique for operating a plurality of industrial devices connected to the outside in a predetermined order, such as a PLC (Programmable Logic Controller). For example, JP2012-194678A describes a technique for generating a program by describing the operation of a PLC on a ladder chart.

SUMMARY OF THE INVENTION

A program generating device according to one aspect of the present invention includes circuitry configured to: display a schedule screen, in which, for each of a plurality of processes executed in a system including a plurality of industrial devices, at least a name of a process is associated with a variable that is at least either referenced or changed in a process program representing an operation of one or more of the plurality of industrial devices and executed in the process, a plurality of names of the plurality of processes obtained from a process database that is stored as process information are included, and an execution order of the plurality of processes can be specified; receive a specification of the execution order on the schedule screen; and generate a system program that operates each of the plurality of industrial devices in the specified execution order based on the execution order and the variable of each process included in the execution order.

BRIEF DESCRIPTION OF THE DRAWINGS

FIG. 3 is a diagram for explaining a procedure of generating the process program.

FIG. 11 is a diagram illustrating an example of data storage of a process database.

FIG. 14 is a diagram illustrating a procedure for converting a program generated by an existing tool.

FIG. 16 is a diagram showing an example of data storage of a process database of modification example (2).

FIG. 17 is a diagram illustrating an example of a schedule screen G1 of modification example (3).

DESCRIPTION OF THE EMBODIMENTS

According to the viewpoint of the inventors of the present invention, a program for operating a plurality of industrial devices connected to the outside in a predetermined order has been required to be generated by using a ladder chart, for example, and generating the program is very laborious. Accordingly, as a result of intensive research and development to simplify a generation of a program, the inventors of the present invention have conceived of a new and original program generating device. Hereinafter, a program generating device etc. according to the present embodiment will be described in detail.

1. Overall Configuration of Production System

Figure 1:
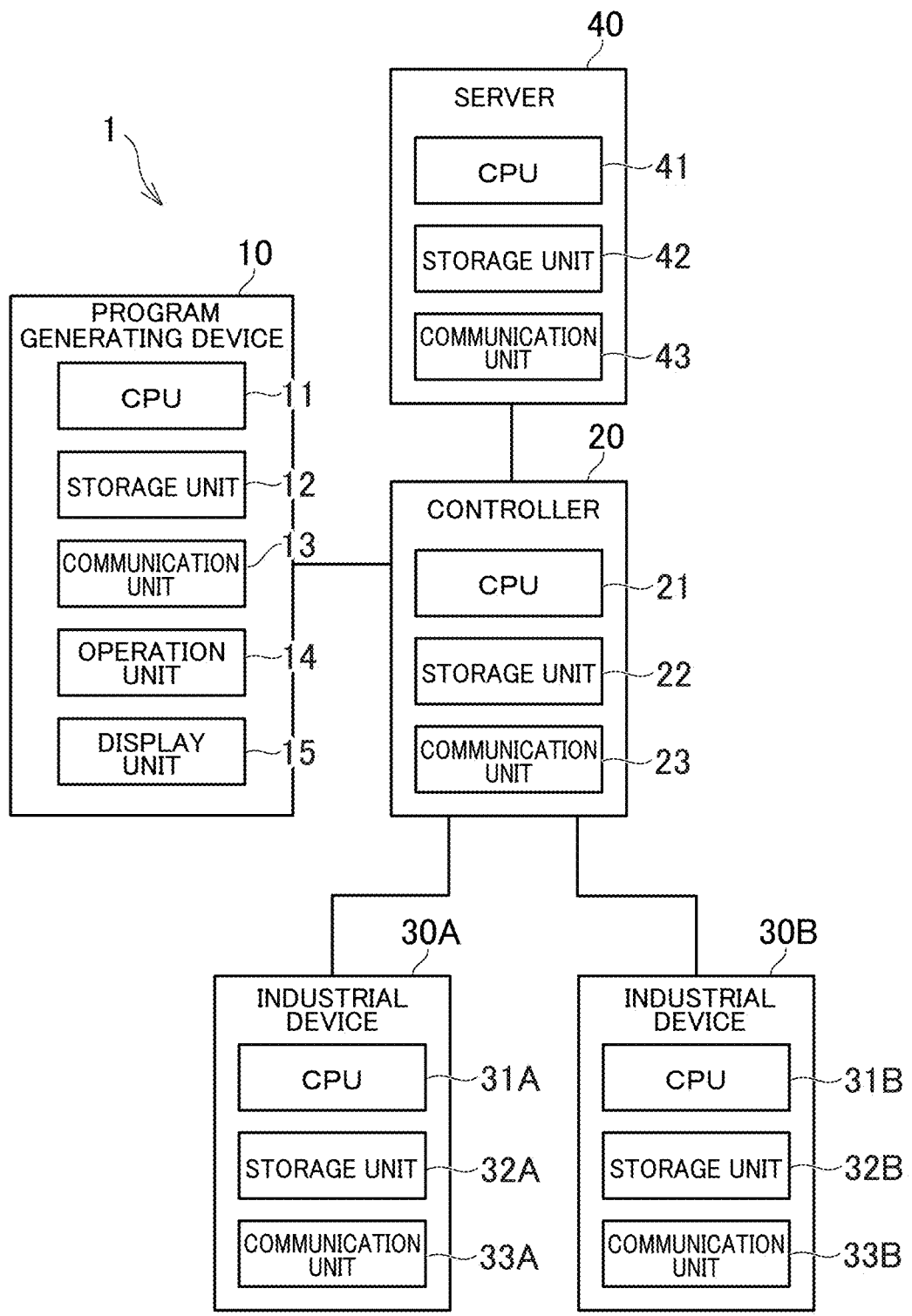
FIG. 1 is a diagram illustrating an overall configuration of a production system including a program generating device according to an embodiment.

FIG. 1 is a diagram illustrating an overall configuration of a production system including a program generating device according to the present embodiment. As shown in FIG. 1, the production system 1 includes a program generating device 10, a controller 20, industrial devices 30A and 30B, and a server 40. These devices are communicably connected using any networks, such as Ethernet (registered trademark) or a communication standard dedicated to industrial devices. In the following description, when it is not necessary to distinguish the industrial devices 30A and 30B in particular, it will be simply described as an industrial device 30. Similarly, when there is no particular need to distinguish CPUs 31A and 31B, storage units 32A and 32B, and communication units 33A and 33B, they are simply referred to as a CPU 31, a storage unit 32, and a communication unit 33.

The program generating device 10 is a computer for generating a program. For example, the program generating device 10 is a personal computer, a portable terminal (including a tablet type terminal), or a mobile phone (including a smart phone). The program generating device 10 includes a CPU 11, a storage unit 12, a communication unit 13, an operation unit 14, and a display unit 15. Although lines are omitted in FIG. 1, the program generating device 10 can be connected to the industrial device 30 and the server 40.

The CPU 11 includes at least one processor. The storage unit 12 includes a RAM and a hard disk, and stores various programs and data. The CPU 11 executes various processing based on the programs and data. The communication unit 13 includes communication interfaces such as a network card and various communication connectors, and communicates with other devices. The operation unit 14 is an input device, such as a mouse and a keyboard. The display unit 15 is a liquid crystal display or an organic electroluminescence display, and displays various screens in accordance with an instruction from the CPU 11.

The controller 20 is a computer that controls a plurality of industrial devices 30. For example, the controller 20 may be a computer called a PLC, or may be a computer of other name having a function equivalent to that of the PLC. For example, the controller 20 and the industrial device 30 may be entirely referred to as a cell, which is a smaller unit than a line, and in this case the controller 20 may be referred to as a cell controller.

The controller 20 include a CPU 21, a storage unit 22, and a communication unit 23. The physical configurations of the CPU 21, the storage unit 22, and the communication unit 23 may be the same as those of the CPU 11, the storage unit 12, and the communication unit 13, respectively. The controller 20 may not only control the industrial device 30 but may also directly control devices such as a robot or a motor connected directly to the industrial device 30, or may request the server 40 to analyze data indicating the operation result of the industrial device 30.

The industrial device 30 is a device for performing processes. The industrial device 30 may be any type of device, for example, a robot controller, a lower-level device of a robot controller, an industrial robot, a motor controller, a lower-level device of a motor controller, a machine tool, a press machine, or a conveying device. The PLC is also a type of an industrial device. The Industrial device 30 includes a CPU 31, a storage unit 32, and a communication unit 33. The physical configurations of the CPU 31, the storage unit 32, and the communication unit 33 may be the same as those of the CPU 11, the storage unit 12, and the communication unit 13, respectively.

The industrial device 30 may include other physical configurations, for example, application-specific integrated circuits called ASIC. Further, the industrial device 30 may be connected to any physical configuration, for example, a device to be controlled such as a motor, a sensor for detecting the operation of the motor etc., a camera for capturing a state of a workpiece to be processed, an input-output device, and other industrial devices. In this embodiment, the controller 20 controls two industrial devices 30, although the number of industrial devices 30 controlled by the controller 20 may be any number, for example, three or more.

The server 40 is a server computer. The server 40 includes a CPU 41, a storage unit 42, and a communication unit 43. The physical configurations of the CPU 41, the storage unit 42, and the communication unit 43 may be the same as those of the CPU 11, the storage unit 12, and the communication unit 13, respectively. The server 40 collects data indicating the operation results of the controller 20 and the industrial device 30, and analyzes the operation based on the collected data. The computer that collects and analyzes data is not limited to the server 40, and may be any other computer. For example, data may be collected and analyzed by the program generating device 10, another device operated by a user, or other server computer.

The programs and data described as being stored in each of the storage units 12, 22, 32, and 42 may be supplied via networks. In addition, the hardware configuration of each device is not limited to the above example, and various types of hardware can be applied. For example, a reading unit (e.g., an optical disk drive or a memory card slot) for reading a computer-readable information storage medium or an input/output unit (e.g., a USB terminal) for directly connecting to an external device may be included. In this case, a program or data stored in the information storage medium may be supplied through the reading unit or the input/output unit.

2. Outline of Program Generating Device

First, an outline of the program generating device 10 will be described. The program generating device 10 generates a system program for the controller 20 to control a plurality of industrial devices 30. When the controller 20 and the industrial device 30 are entirely referred to as a cell, the system program may also be referred to as a cell program. The system program is a program for controlling the execution order of processes by using a variable. The order of execution is an order in which the processes are executed.

The variable is information that is at least either referenced or changed when a process is executed. In the present embodiment, a process program for executing a process is stored in the storage unit 32 of the industrial device 30, and the variable is at least referred to or changed in the process program. To refer to is to read a register corresponding to the variable. To change is to rewrite a value of a register corresponding to the variable.

The variable is a condition for executing a process, and is prepared for each process. The variable can also be referred to as information indicating the operation of the industrial device 30. For example, the variable is a start condition of a process, an interruption condition (pause condition), or an end condition. In addition to the variables serving as the execution conditions of the process, there may be any variable, such as, a variable indicating an execution result of the process, a variable indicating a midway calculation, a variable indicating a setting of the industrial device 30, and a variable indicating a detection result of the sensor. The variable may also be referred to as an input/output variable. The variable corresponds to the register of the industrial device 30. The variable is referenced by the industrial device 30 or other devices (e.g., controller 20).

The process is a task or an operation performed by the industrial device 30. The process may consist of only one task or operation, or a combination of tasks or operations. The industrial device 30 is capable of executing a process for any application, and executes, for example, recognition of a workpiece, gripping of a workpiece, opening and closing of a door, setting of a workpiece, an operation of fixing a workpiece to a machine tool, or processing using a machine tool. The industrial device 30 executes at least one process. The industrial device 30 may execute only one process or a plurality of processes.

A process program is a program in which individual procedures in a process are defined. The process program may also be referred to as a program defining the operation of the industrial device 30. The process program may be generated in any language, for example, a ladder language or a robot language. The language of the process program may be different depending on the industrial device 30, for example, the process program of the industrial device 30A may be a ladder language, and the process program of the industrial device 30B may be a robot language.

In this embodiment, a process program is prepared for each process, and the process and the process program have a one-to-one relationship. As such, if an industrial device 30 executes n processes (n is a natural number), the industrial device 30 stores at least n process programs. The process and the process program may not have a one-to-one relationship, and for example, a plurality of processes may be executed by one process program, or a plurality of process programs may be prepared to execute one process.

Figure 2:
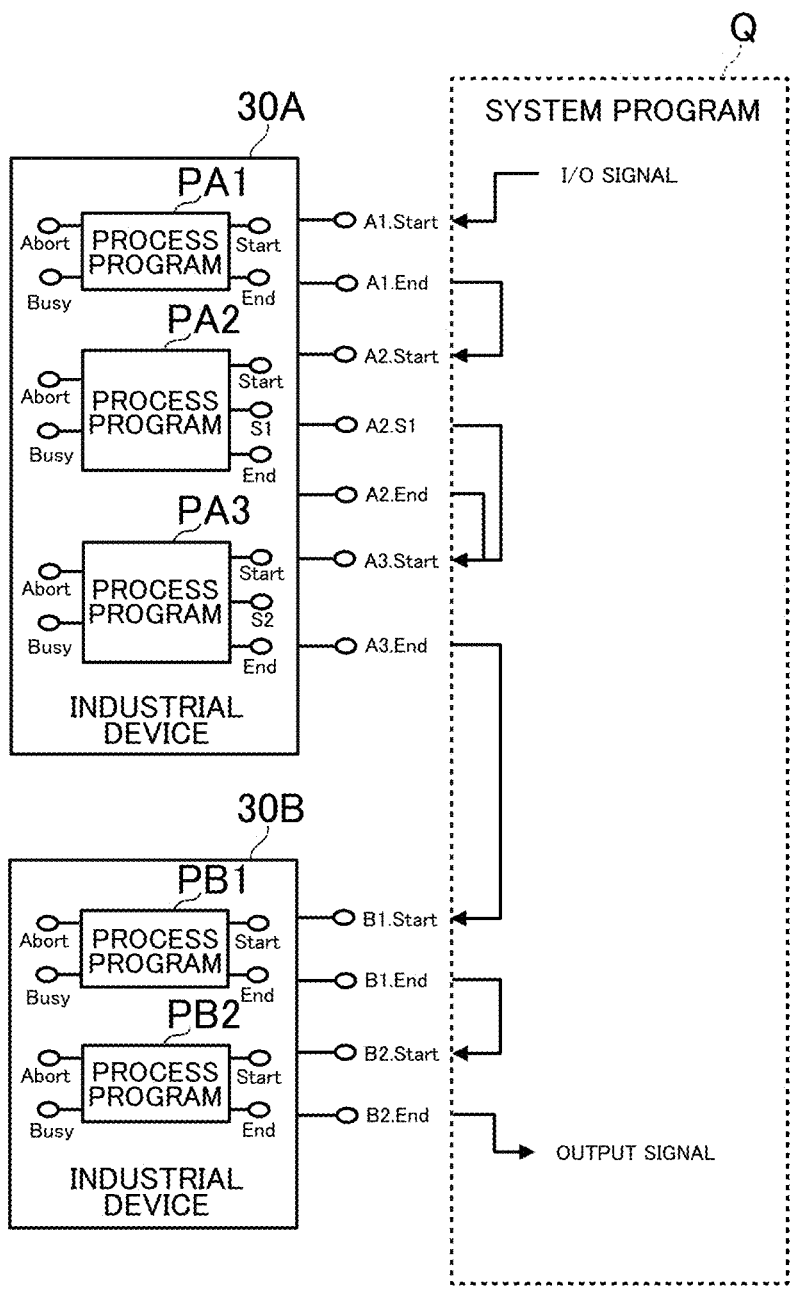
FIG. 2 is a diagram illustrating a relationship between a system program and a process program.

FIG. 2 is a diagram illustrating a relationship between a system program and a process program. In this embodiment, the industrial device 30A executes three processes A1, A2, and A3, and then the industrial device 30B executes two processes B1 and B2. As shown in FIG. 2, the industrial device 30A stores process programs PA1, PA2, and PA3 respectively corresponding to the processes A1, A2, and A3. The industrial device 30B stores process programs PB1 and PB2 respectively corresponding to the processes B1 and B2. In the following, when individual process programs are not distinguished, they are simply described as the process program P.

In the example of FIG. 2, as default variables of the process program P, a start variable "Start" indicating start of execution, an interrupt variable "Abort" indicating interruption (pause), a busy variable "Busy" indicating a busy state, and an end variable "End" indicating end of execution are prepared. Variables other than these default variables can also be set in the process program P. For example, a variable indicating a value of a predetermined signal, or a variable indicating a midway calculation may be prepared.

In this embodiment, a case is described in which a user operates the program generating device 10 to generate a process program P, although the process program P may be generated by another computer. For example, when a user of the controller 20 and a user of the industrial device 30 are different from each other, the process program P is generated by a computer other than the program generating device 10. The system program Q is a program for controlling the execution order of the process, and thus the process program P is generated before the system program Q is generated.

FIG. 3 is a diagram for explaining a procedure of generating the process program P. Here, a procedure of generating a process program PA2 will be described as an example. As shown in FIG. 3, the user generates a process project using an engineering tool installed in the program generating device 10 (step 1 of FIG. 3). The process project is a management unit of the process program PA2, and any project name may be set, such as a name of the industrial device 30 and a name of the process.

When the process project is generated, the user performs initial setting of the process program PA2 (step 2 in FIG. 3). In the initial setting, basic information of the process program PA2 is set, and, for example, the name of the industrial device 30A that executes the process, the type of the process program PA2, and the name of the process are specified. The name of the process is information for uniquely identifying the process in the industrial device 30. The name of the process may be any character string entered by the user and is set so as not to overlap with other processes. Assume that estimated execution time described later is also specified in step 2.

In step 2 of FIG. 3, default variables are set for the process program PA2 being generated. For example, as the default variables of the process program PA2, the start variable "Start", the interrupt variable "Abort", the busy variable "Busy", and the end variable "End" are set. For example, when the start variable "Start" in the process A2 is changed to a predetermined value, the process program PA2 is executed and the process A2 is started. Further, for example, when all the instructions described in the process program PA2 are executed and the process terminates, the end variable "End" of the process A2 is changed to a predetermined value.

This embodiment also provides default valuables for other processes A1 and A3. As such, the character string "A2" identifying the process A2 is given to the name of the process so that the variable of the process A2 may be identified. For example, the name of the start variable in the process A2 is "A2. Start", and the name of the end variable in the process A2 is "A2. End." Although omitted in FIGS. 2 and 3, the character strings of "A2" are also given to the interrupt variable "Abort" and the busy variable "Busy."

The user can set a variable other than the default variables. For example, when setting another variable, the user inputs "S1" indicating a name of a predetermined signal in the industrial device 30A (step 3 in FIG. 3). Similar to the start variable, for example, the name of another variable is given a character string "A2" for identifying the process A2 and becomes "A2.S1". When the setting of the variables is completed, the process program PA2 is programmed (step 4 in FIG. 3), and the generation of the process program PA2 is completed. Various known techniques can be applied to the programming of the process program PA2, for example, a ladder language or a robot language may be used. In programming or variable setting, the user may input supplementary comments for explanation.

When the process program. PA2 is generated, actual data of the process program PA2 is recorded in the industrial device 30A. Further, the process information in which the name of the process designated by the user and the names of the variables are stored is registered in a process database of the controller 20. Details of the process information and the process database will be described later. The user repeats the above-mentioned generating steps as many times as the number of processes, and generates the process program P and the process information of each process.

In this embodiment, when the process programs PA1, PA2, and PA3 are generated, the order of executing the process programs in the industrial device 30A is specified and stored in the process information. The same applies to the process programs PB1 and PB2. The execution order in the industrial device 30B is specified at the time of generating these programs and stored in the process information. However, whether the process to be executed by the industrial device 30A or the process to be executed by the industrial device 30B is executed first is not specified at the time of generating the process programs P, and is specified on a schedule screen to be described later.

When completing the generation of the process program P and the registration of the process information, the user generates a system program Q. In this embodiment, the processes are executed in the order of A1, A2, A3, B1, and B2, and thus the user generates the system program Q such that the process programs PA1, PA2, PA3, PB1, and PB2 are executed in this order.

In the example of FIG. 2, the process A1 starts when a predetermined input/output signal is entered. For example, the input/output signal is entered from an external device such as a button provided in the controller 20 or the industrial device 30A. When input/output signals are entered, the system program Q changes the star variable "A1. Start" of the process A1 to a predetermined value. When the start variable "A1. Start" is changed to the predetermined value, the process program PA1 is executed to start the process A1.

When the process A1 ends successfully, the end variable "A1.End" of the process A1 becomes a predetermined value. When the end variable "A1.End" becomes the predetermined value, the system program Q changes the start variable "A2.Start" of the subsequent process A2 to a predetermined value. When the starting variable "A2. Start" is changes to the predetermined value, the process program PA2 is executed to start the process A2.

When the process A2 ends successfully, the variable "A2.S1" and the end variable "A2.End" of the process A2 become predetermined values. When these values become predetermined values, the system program Q changes the start variable "A3. Start" of the subsequent process A3 to a predetermined value. When the start variable "A3. Start" is changed to the predetermined value, the process program PA3 is executed to start the process A3.

When the process A3 ends successfully, the end variable "A3.End" of the process A3 becomes a predetermined value. When the end variable "A3.End" becomes the predetermined value, the system program Q changes the start variable "B1.Start" of the subsequent process B1 to a predetermined value. When the start variable "B1. Start" is changed to the predetermined value, the process program PB1 is executed to start the process B1.

When the process B1 ends successfully, the end variable "B1.End" of the process B1 becomes a predetermined value. When the end variable "B1.End" becomes the predetermined value, the system program Q changes the start variable "B2.Start" of the subsequent process B2 to a predetermined value. When the start variable "B2. Start" is changed to the predetermined value, the process program PB2 is executed to start the process B2.

When the process B2 ends successfully, the end variable "B2.End" of the process B2 becomes a predetermined value. When the end variable "B1.End" becomes a predetermined value, the system program Q causes the industrial device 30B to output a predetermined output signal, and all the processes of the first cycle are completed. The output signal may be a signal to the controller 20, or a signal to a device such as an external sensor or LED light.

The start and end variables of each process are changed to initial values at any timing, such as at the end of the cycle or after the end of each process. The second cycle may be started after the end of the first cycle or may be started in the middle of the first cycle. When the start timing of the second cycle arrives, the system program Q changes the start variable "A1. Start" of the process A1 to a predetermined value, and the processes of the second cycle start. Thereafter, each process is periodically executed in the same manner as in the first cycle.

The program generating device 10 is provided with an engineering tool for simplifying the generation of the system program Q as described above. When the engineering tool is started in the program generating device 10, a schedule screen for generating the system program Q by specifying the execution order of the processes is displayed on the display unit 15.

Figure 4:
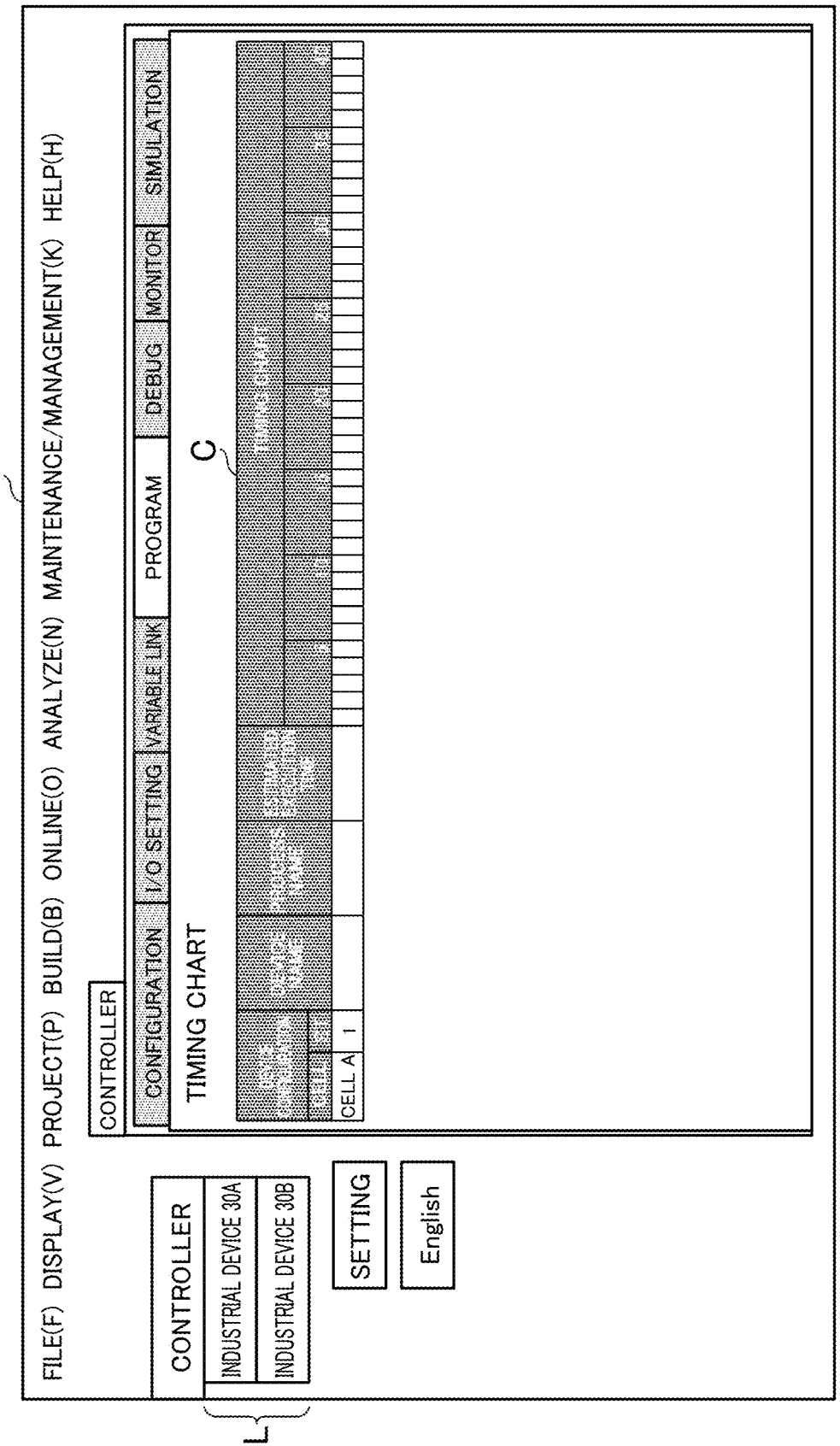
FIG. 4 is a diagram illustrating an example of a schedule screen.

FIG. 4 is a diagram illustrating an example of the schedule screen. As shown in FIG. 4, a schedule screen G1 is has various user interfaces for supporting the user's work. The schedule screen G1 may be capable of setting variables and simulation, for example, in addition to the generation of a program. For example, a timing chart C for specifying the execution order of the processes is displayed on the schedule screen G1.

For example, a timing axis (time axis) is set in the timing chart C in the right direction (lateral direction). The farther to the right of the screen, the later in time. In the timing chart C, numerical values are displayed every predetermined time (5 seconds in FIG. 4), and grids indicating a unit time (1 second in FIG. 4) are arranged. In the example of FIG. 4, five grids are arranged between 0 and 5 seconds.

In the timing chart C, the user specifies the execution order of the processes executed by the industrial device 30 and generates the system program Q. In the example of FIG. 4, the user has not yet specified the industrial unit 30, and the timing chart C does not display information about the process.

For example, the schedule screen G1 displays a list L indicating the names of the industrial devices 30 to be controlled by the controller 20. In this embodiment, the industrial devices 30A and 30B are controlled, and thus the names of these two devices are displayed on the list L. For example, when the user drags and drops the name of the industrial device 30A from the list L onto the timing chart C, the information of the processes A1, A2, and A3 to be executed by the industrial device 30A is displayed on the timing chart C.

Figure 5:
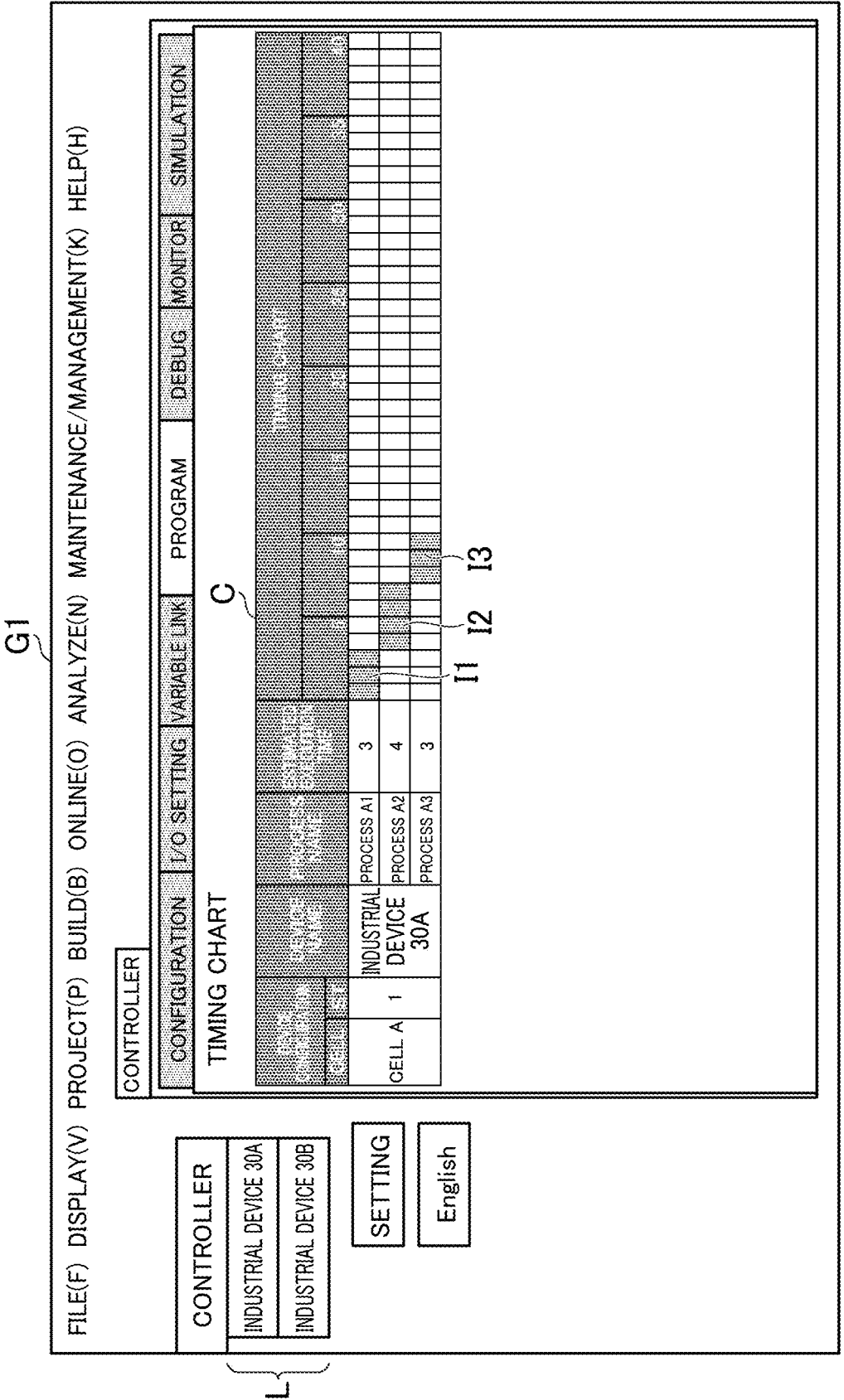
FIG. 5 is a diagram illustrating an example of a timing chart where a name of an industrial device is dragged and dropped.

FIG. 5 is a diagram illustrating an example of the timing chart C when the name of the industrial device 30A is dragged and dropped. As shown in FIG. 5, the timing chart C displays the name of the industrial device 30A, a name of each of the processes A1, A2, and A3, and the estimated execution time set for each process. The timing chart C may display other information included in the process information (e.g., the names of the variables and the execution order in the industrial device 30A).

Figure 9:
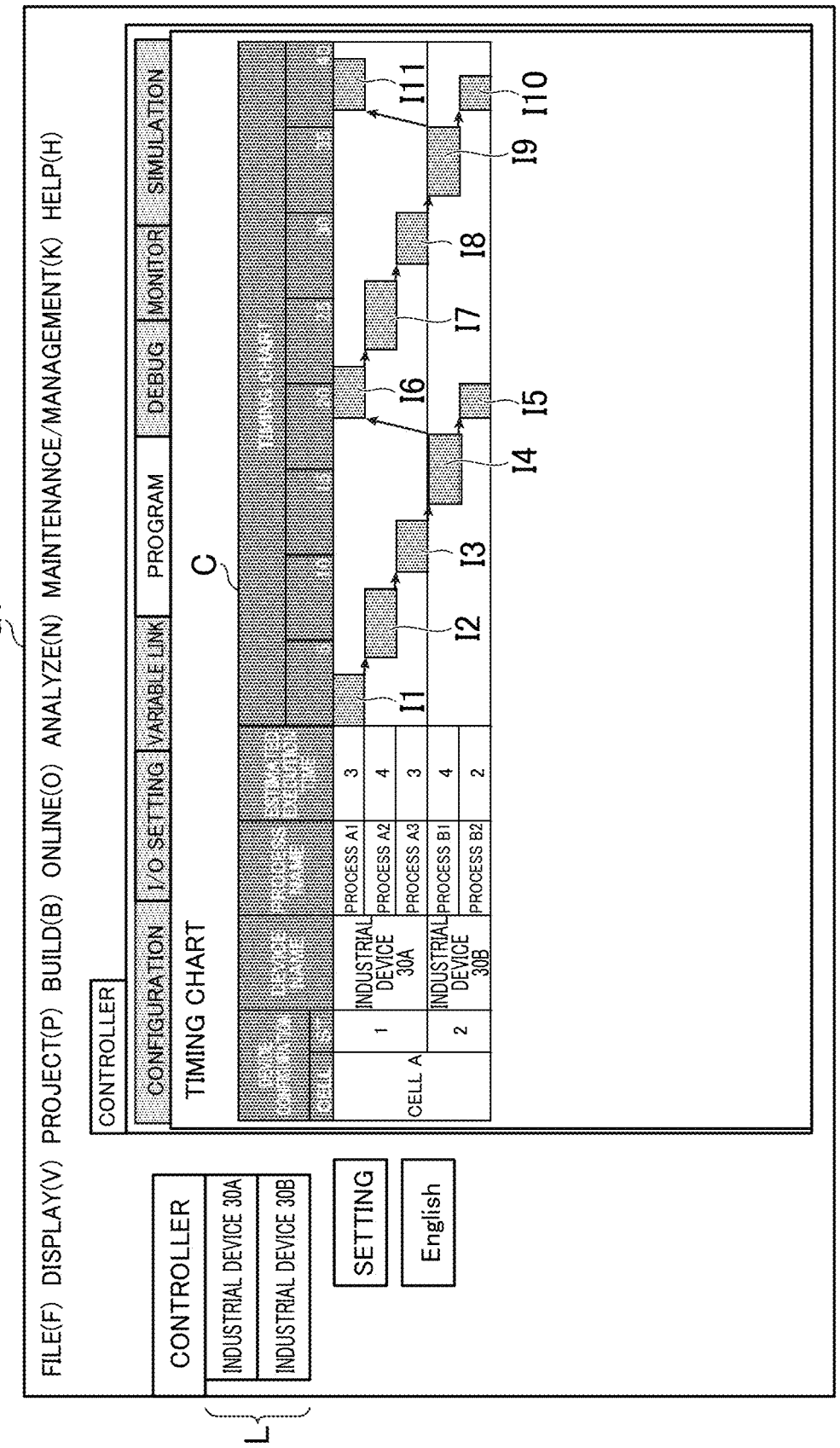
FIG. 9 is a diagram illustrating another layout of the timing chart.

The estimated execution time is an estimated time required for execution of each process. In this embodiment, the estimated execution time is defined in units of 1 second, although the execution time may be defined in other units such as 2 seconds or 0.5 seconds. In the example of FIG. 5, the estimated execution time of each of the processes A1, A2, and A3 is 3 seconds, 4 seconds, and 3 seconds. In the example of FIG. 5, the time required for shifting from one process to the next process is not considered, but the time between the processes may be considered as shown in FIG. 9 described later.

In this embodiment, the execution order of the processes A1, A2, and A3 in the industrial device 30 is specified in advance, and thus the names of these processes are displayed in the order of execution from top to bottom in the timing chart C. By arranging the names of the respective processes in the order of execution, the user can intuitively grasp the order of execution.

In the timing chart C, process images I1, I2, and I3 respectively indicating the processes A1, A2, and A3 are displayed on the timing axis in the execution order. For example, the estimated execution time of the process A1 is 3 seconds, and the process image I1 is displayed such that three grids from 1 second to 3 seconds in the row of process A1 are filled with a predetermined color. The estimated execution time of the process A2 is 4 seconds, and the process image I2 is displayed to fill the four grids from 4 seconds to 7 seconds in the row of process A2. The estimated execution time of the process A3 is 3 seconds, and the process image I3 is displayed to fill the three grids from 8 seconds to 10 seconds in the row of process A3.

As shown in FIG. 5, the process images I1, I2, and I3 each have a length corresponding to the estimated execution time, and the user can intuitively grasp the length of the estimated execution time of each of the processes A1, A2, and A3. Further, the process images I1, I2, and I3 are arranged in the execution order on the timing axis, and thus the user can grasp the order of execution of the processes A1, A2, and A3 in time series.

In the state of FIG. 5, only the industrial device 30A is selected, and the user also selects the name of the industrial device 30B. For example, when the user drags and drops the name of the industrial device 30B from the list L onto the timing chart C, the information of the processes B1 and B2 to be executed by the industrial device 30B is displayed on the timing chart C.

Figure 6:
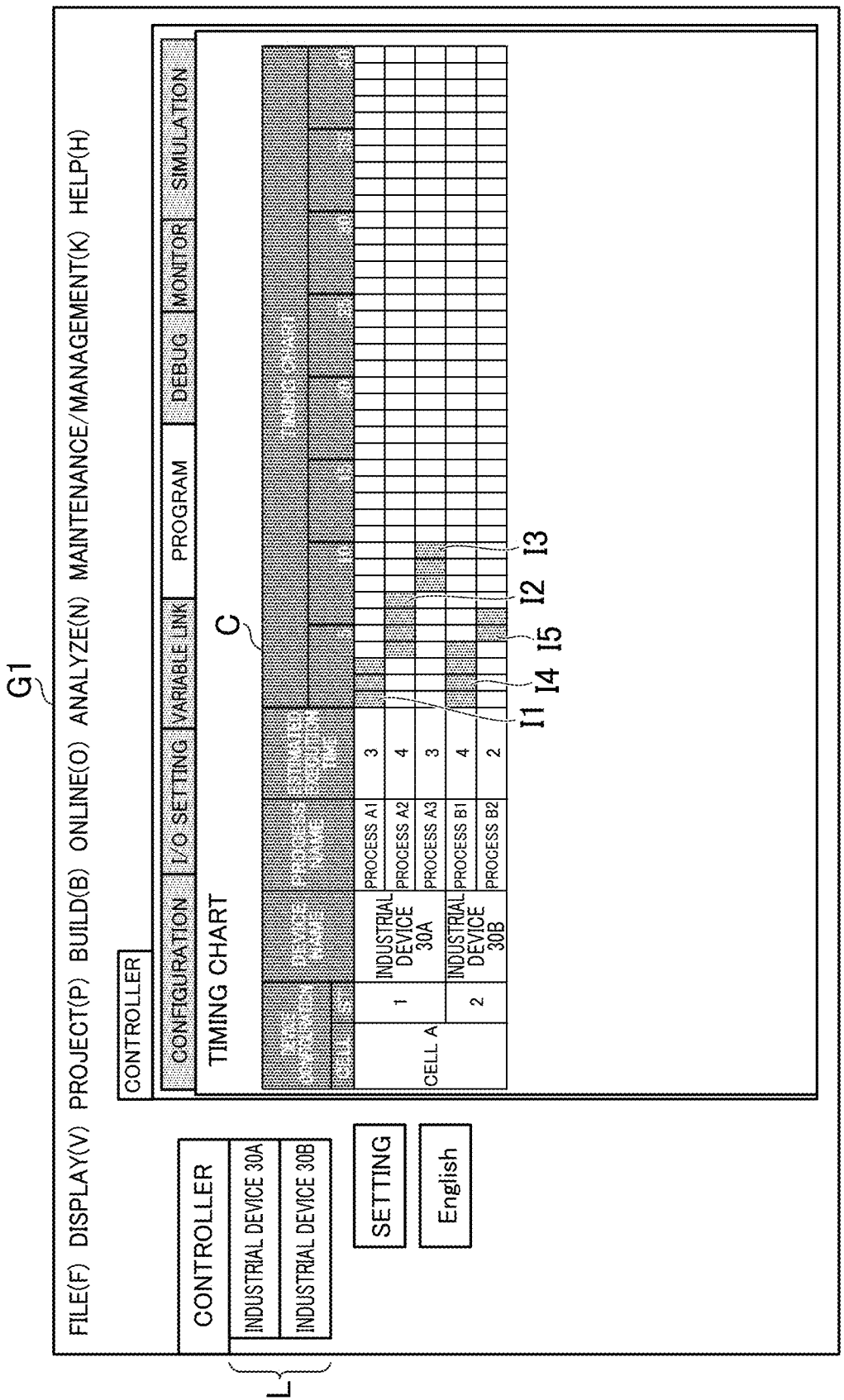
FIG. 6 is a diagram illustrating an example of a timing chart where a name of an industrial device is dragged and dropped.

FIG. 6 is a diagram illustrating an example of the timing chart C when the name of the industrial device 30B is dragged and dropped. As shown in FIG. 6, the timing chart C displays the name of the industrial device 30B, a name of each of the processes B1 and B2, and the estimated execution time set for each process. In the example of FIG. 6, as shown by the process images 14 and 15, the estimated execution time of each of the processes B1 and B2 is 4 seconds and 2 seconds.

In the state of FIG. 6, only the name of the industrial device 30B is dragged and dropped on the timing chart C, and the order of execution of the processes A1, A2, and A3 and the processes B1 and B2 is not yet specified. As such, on the timing chart C, the temporal relationship between the processes A1, A2, and A3 and the processes B1 and B2 is not distinguished, and thus the process A1 starts from 0 second and the process B1 also starts from 0 second.

In this embodiment, the execution order of the processes can be specified by dragging and dropping the process image I displayed in the timing chart C and moving it. As described above, the process B1 is executed after the process A3, and the user specifies the execution order of the processes by dragging and dropping the process image I4 so as to be later than the process A3 (at a position on or later than 11 seconds to the right of the process image I3).

Figure 7:
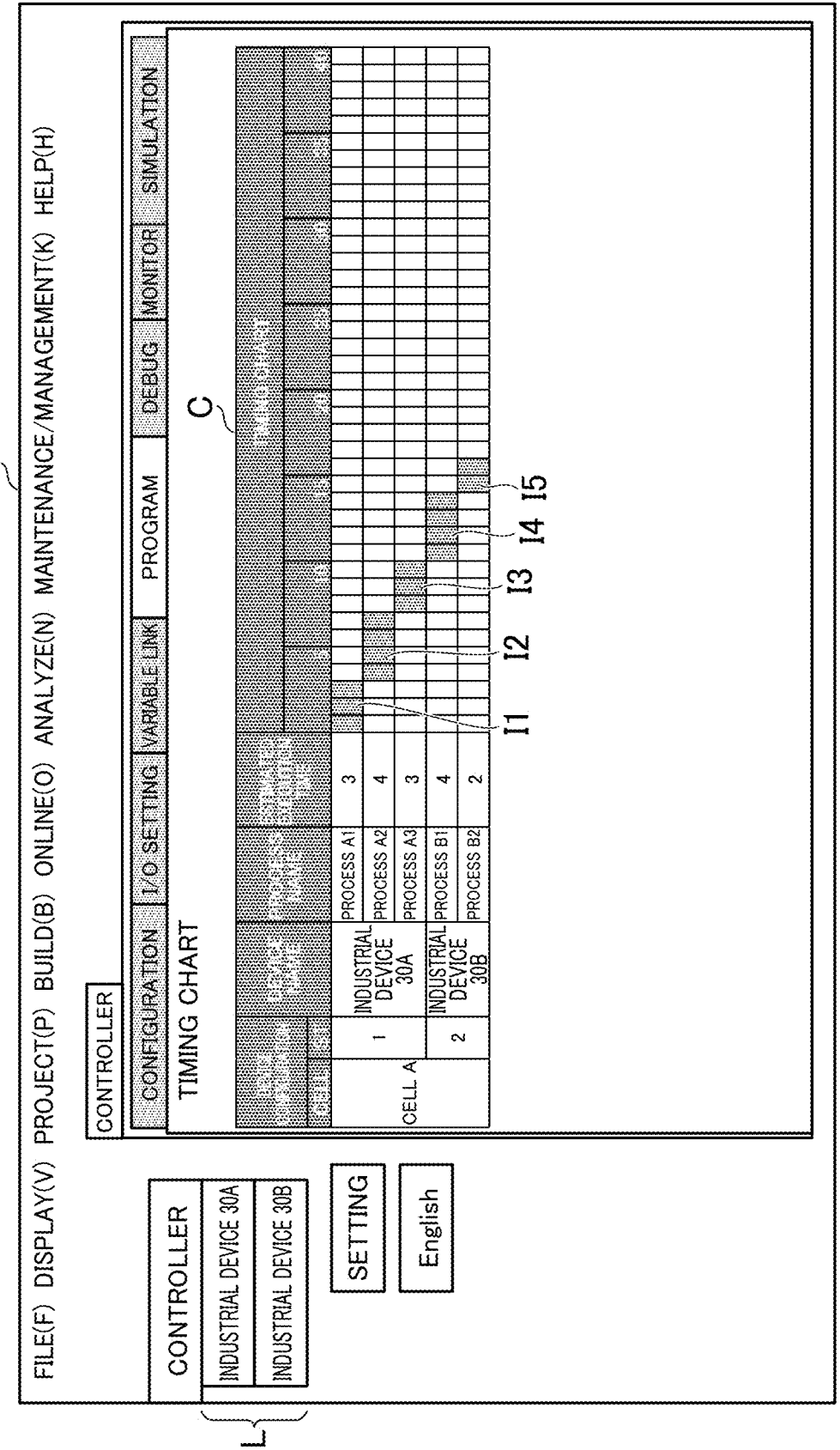
FIG. 7 is a diagram illustrating an example of the timing chart in a case where an execution order of processes is specified.

FIG. 7 is a diagram illustrating an example of the timing chart C in a case where the execution order of the processes is specified. As shown in FIG. 7, when the execution order of the processes is specified, the process image I4 moves after the process image I3, and moves to a position of 11 to 14 seconds in the row of the process B1. The process image I5 is moved in the same manner, and is moved to a position of 15 to 16 seconds in the row of the process B2. In this manner, the user specifies the execution order of the processes by dragging and dropping the process images I.

The method of specifying the execution order of the processes is not limited to the above example, and other operations may be used. For example, in the state of FIG. 6, the user may specify the execution order of the processes by dragging and dropping the process image I5. For example, the user may drag and drop the process image I5 so as to be after the process A3 (to the right of the process image I3). In this case, the timing chart C is in the same state as in FIG. 7.

Further, for example, in the state of FIG. 6, the user may specify the execution order of the processes by dragging and dropping the process image I1 to be before the process B1 (at a position before 0 seconds to the left of the process image I4). In this case, the user specifies that the execution order of the processes A1, A2, and A3 is earlier than that of the processes B1 and B2, and the timing chart C is in the same state as in FIG. 7. Further, for example, in addition to the drag and drop of the process image I, the execution order of the processes may be specified by clicking or tapping any position (grid) in the timing chart C.

The execution order of the processes is specified by the above operation. In this embodiment, the start timing of the second cycle can be specified in the timing chart C. For example, in the state of FIG. 7, when the user selects a certain position in the row of the process A1 as the start timing of the second cycle, the processes of the second and subsequent cycles are displayed in time series.

Figure 8:
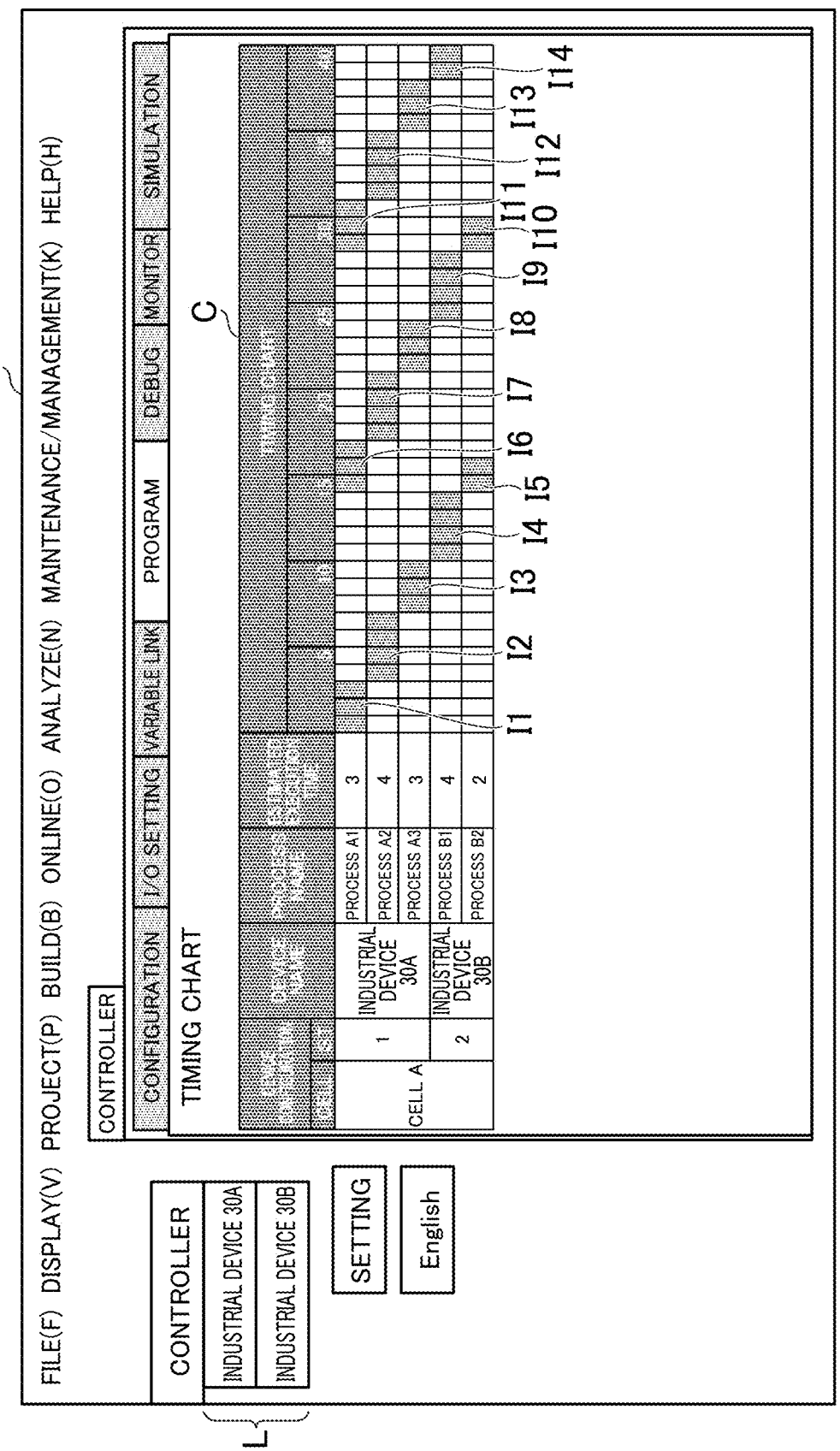
FIG. 8 is a diagram illustrating an example of the timing chart where start timing of a second cycle is specified.

FIG. 8 is a diagram illustrating an example of the timing chart C when the start timing of the second cycle is specified. For example, as shown in FIG. 8, when the user selects the grid of fifteenth second in the row of the process A1 as the start timing of the second cycle, the process image I6 indicating the process A1 of the second cycle is displayed in 15 to 17 seconds in the row of the process A1.

The execution order of the processes and the estimated execution time are not changed in the second and subsequent cycles, and thus, as shown in FIG. 8, the process images I7, I8, I9, and I10 showing the processes A2, A3, B1, and B2 in the second cycle are displayed so that the execution order of the first cycle is maintained in the second and subsequent cycles. Similarly, the process images I11, I12, I13, and I14 are displayed so that the third and subsequent cycles are started at the same start timing as the second cycle. The process image I that does not fit into the screen is displayed by a scroll operation.

When the execution order of processes is specified as described above, the user executes a build operation for generating the system program Q. The build operation is executed based on the process information of each process program P and the execution order specified on the timing chart C, and the system program Q is generated.

As the program for executing the build operation, various known programs can be used. For example, if a ladder language is used, a start switch and coils are arranged so that the values of the start variable etc. of each process are changed in the execution order specified by the user, and the system program Q is generated. For example, if a robot language is used, a command for conditional branch is written so that the values of the start variable etc. of each process are changed in the execution order specified by the user, and the system program Q is generated. When the system program Q is generated, the controller 20 stores the system program Q.

As described above, in this embodiment, the system program Q is generated by specifying the execution order of the processes on the timing chart C. This eliminates the need of manually generating a ladder chart, for example, and the system program Q can be easily generated. Example of the timing chart C are not limited to the examples of FIGS. 4 to 8, and any layout can be employed. The timing chart C may have any layout capable of displaying the operations of the industrial device 30 in time series.

FIG. 9 is a diagram illustrating another layout of the timing chart C. As shown in FIG. 9, the timing chart C may not have a grid indicating a unit time. In the example of FIG. 9, the time period in which each process is executed is shown by the process images I1 to I11. Further, in the timing chart C of FIGS. 4 to 8, a time interval is not provided between one process and the next process, although as shown in FIG. 9, a time interval (for example, 1 second) may be provided between the processes.

In the example of FIG. 9, the process images I1 to I11 are connected by arrows so that the start condition of each process may be visually understood. In the case of the timing chart C shown in FIG. 9, the user may also specify the execution order of the processes by dragging and dropping the process images I1 to I11, for example. As another example, the user may specify the execution order of the processes by connecting the processes A3 and B1 with arrows.

As described above, the program generating device 10 of the present embodiment has a configuration that simplifies the generation of the system program Q. Details of such configuration will be described below.

3. Functions Implemented in Production System

Figure 10:
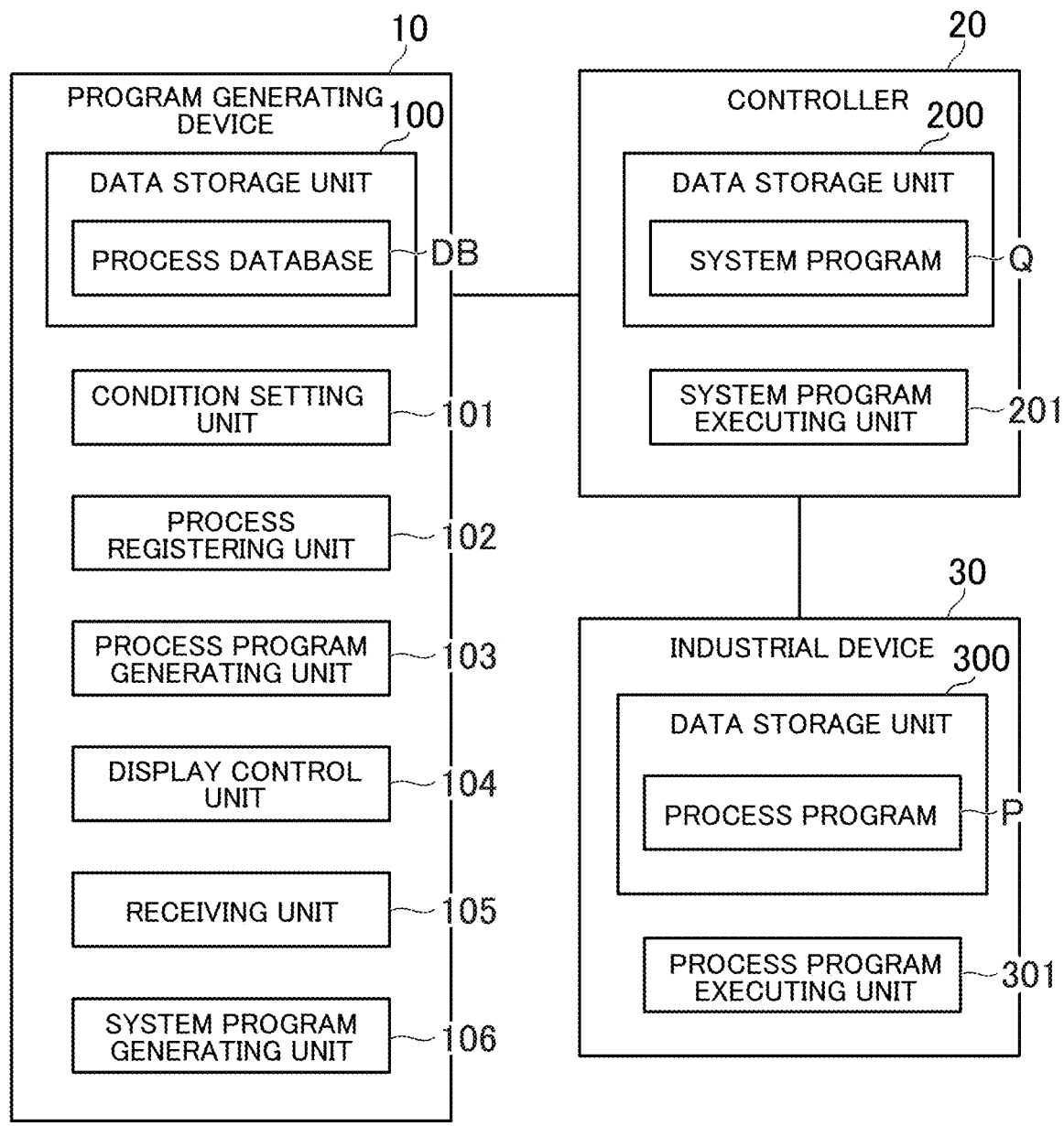
FIG. 10 is a functional block diagram showing functions implemented in the production system.

FIG. 10 is a functional block diagram showing functions implemented in the production system 1. In this embodiment, functions implemented by each of the program generating device 10, the controller 20, and the industrial device 30 will be described. The same functions are implemented in each of the industrial devices 30A and 30B, and thus one industrial device 30 will be described in FIG. 10.

[3-1. Functions Implemented by Program Generating Device]

As shown in FIG. 10, the program generating device 10 implements a data storage unit 100, a condition setting unit 101, a process registering unit 102, a process program generating unit 103, a display control unit 104, a receiving unit 105, and a system program generating unit 106.

[Data Storage Unit]

The data storage unit 100 is implemented mainly by the storage unit 12. The data storage unit 100 stores the data required for generating the system program Q. For example, the data storage unit 100 stores a process database DB in which the process information of each process is stored.

FIG. 11 is a diagram illustrating an example of data storage of the process database DB. As shown in FIG. 11, the process database DB stores the names of the industrial devices 30 and process information of the processes executed by the industrial devices 30. For example, when a process program P of a new process is generated, process information of the new process is registered in the process database DB by the process registering unit 102 described later. The process information may be editable after being registered in the process database DB. In this embodiment, the process information of all the industrial devices 30 to be controlled by the controller 20 is stored in the process database DB, although the process information of only some of the industrial devices 30 may be stored in the process database DB.

The process information indicates basic information of the process, and the content thereof is set by the condition setting unit 101 described later. The process information stores information necessary for generating the system program Q on the schedule screen G1. For example, the process information includes the name of the process, the estimated execution time, the execution order, the name of the variable, the execution condition, and the comments.

The name of the process is a name specified at the time of generating the process program P. The name of the process may be determined such that the process can be uniquely identified in the industrial device 30, and may be the same as the name of the process of the other industrial device 30. In this embodiment, the user specifies the name of the process, although the name of the process may be automatically assigned based on predetermined rules. The name of the process may be something uniquely specifying the process, such as an ID of the process.

In this embodiment, the estimated execution time is a numerical value specified when the process program P is generated. The estimated execution time may not be specified by the user, but may be a numerical value calculated by simulation. The estimated execution time may be editable as in the modification example described later.

The execution order is an order of executing the processes within the entire production system 1. In this embodiment, the local execution order in the industrial device 30 is specified when the process program P is generated, and thus the specified execution order is stored when the process is registered. The execution order in the entire production system 1 is specified after the process is registered, and thus the local execution order is changed to the execution order in the entire production system 1.

For example, when the process programs PA1, PA2, and PA3 are generated, "1", "2", and "3" are respectively specified as the order of executing the processes A1, A2, and A3. Further, for example, when the process programs PB1 and PB2 are generated, "1" and "2" are respectively specified as the order of executing the processes B1 and B2. At this point of time, only the execution order in the industrial device 30 is specified, and thus which of the processes A1, A2, and A3 and the processes B1 and B2 are to be executed first. As described with reference to FIG. 7, when the user specifies the execution order on the schedule screen G1, the execution orders of the processes B1 and B2 are changed to "4" and "5".

When generating the process program P, the local execution order may not be specified in the industrial device 30. In this case, the execution order may not be stored when the process is registered, and when the user specifies the execution order on the schedule screen G1, the specified execution order may be stored in the process information. For example, the user specifies "1", "2", "3", "4", and "5" as the execution order of each of the processes A1, A2, A3, B1, and B2 on the schedule screen G1, and these execution orders are stored in the process information.

The name of the variable is a name that is set when the process program P is generated. In this embodiment, not only the default variable but also any variable can be specified by the user, and thus the name of the variable specified by the user may be stored. As described above, the name of the variable in this embodiment includes the name of the process (a character string such as "A1") and a character string indicating the type of the variable (a character string such as "Start"), and whereby the names of the variables do not overlap between the processes.

The names of the variables may be set according to any rules, and are not limited to the examples of this embodiment. For example, the variable name may include the name of the industrial device 30 (a character string such as "EquipA"), and may be identifiable as to which industrial device 30 the variable is for. Further, for example, the variable name may be defined by a character string that can uniquely identify the variable in the production system 1 or the industrial device 30 without specifically including the name of the industrial device 30 or the name of the process. Similarly to the name of the process, the name of the variable may be something uniquely identifying the variable, such as the ID of the variable.

Further, for example, the name of the variable managed by the controller 20 may be different from the name of the variable managed by the industrial device 30. That is, the name by which the controller 20 identifies the variable and the name by which the industrial device 30 identifies the variable may be different. Here, the former is called a system variable and the latter is called a device variable, the data storage unit 100 stores a table or a data base for converting the system variable and the device variable to each other. When the controller 20 refers to a variable of the industrial device 30, a system variable is converted to a device variable, and then a register read corresponding to the device variable is performed. Similarly, when the controller 20 changes a variable of the industrial device 30, a system variable is converted into a device variable.

The execution condition is a condition indicating whether to change a variable. A condition for starting the process is set as the execution condition for the start variable. A condition for interrupting the process is set as the execution condition for the interruption variable. A condition for making the process a busy state is set as the execution condition for the busy variable. A condition for ending the process is set as the execution condition for the end variable.

In this embodiment, the local execution order in the industrial device 30 is specified when the process program P is generated, and thus, the execution conditions are stored in accordance with the specified execution order at the time the process is registered. The execution order in the entire production system 1 is specified after the process is registered, and thus the execution condition is changed according to the execution order in the entire production system 1.

For example, when an input/output signal is input at the time the process program PA1 is generated, the start of the process A1 is specified. The condition for executing the process A1 is a variable "IO1.Input1" indicating an input/output signal. When the variable "IO1.Input1" becomes a predetermined value, the start variable "A1.Start" becomes a predetermined value, and the process A1 starts.

For example, when the process program PA2 is generated, it is specified that the process A2 is executed after the process A1. The condition for executing the process A2 is the end variable "A1.End" of the process A1. When the end variable "A1.End" becomes a predetermined value, the start variable "A2.Start" becomes a predetermined value, and the process A2 starts.

For example, when the process program PA3 is generated, it is specified that the process A3 is executed after the process A2. Further, it is specified that the variable "A2.S1" of the process A2 is also a condition for starting the process A3. As such, the execution condition of the process A3 is the end variable "A2.End" of the process A2. When each of the variable "A2.S1" and the ending variable "A2.End" becomes a predetermined value, the start variable "A3.Start" becomes a predetermined value, and the process A3 starts.

In this embodiment, when the process program PB1 is generated, the condition for starting the process B1 is not specified. To execute the process B1 after the process A3 is specified on the schedule screen G1, and thus, when such specification is received (when the screen is changed from FIG. 6 to FIG. 7), the execution condition of the process B1 is the end variable "A3.End" of the process A3. When the end variable "A3.End" becomes a predetermined value, the start variable "B1.Start" becomes a predetermined value, and the process B1 starts.

For example, when the process program PB2 is generated, it is specified that the process B2 is executed after the process B1. The execution condition of the process B2 is the end variable "B1.End" of the process B1. When the end variable "B1.End" becomes a predetermined value, the start variable "B2.Start" becomes a predetermined value, and the process B2 starts.

The data stored in data storage unit 100 is not limited to the example described above. For example, the data storage unit 100 stores a program for executing the build operation of the system program Q. Further, for example, the data storage unit 100 may store image data of an image displayed on the schedule screen G1 or may store an engineering tool. For example, the data storage unit 100 may store the generated process program P and system program Q.

[Condition Setting Unit]

The condition setting unit 101 is mainly implemented by the CPU 11. The condition setting unit 101 sets a condition of at least one of the start variable and the change variable for a new process that is not registered in the process database DB. In this embodiment, both the conditions of the start variable and the change variable are set for a new process, although the condition setting unit 101 may set only one of the condition of the start variable and the condition of the change variable.

A new process that is not registered is a process for which process information is not registered (stored) in the process database DB. That is, a process for which process information will be registered is a new process that has not yet been registered. In other words, a process for which a process program P will be newly generated is a new process that has not yet been registered.

As described above, the start variable is a variable serving as a start condition for a process. A start variable having an initial value (e.g., 0) means that process does not start, and a start variable having a predetermined value (e.g., 1) means that the process starts. For example, the process program P periodically changes its start variable, and when the start variable becomes a predetermined value, executes the first written instruction. The condition for the start variable is a condition for changing the value of the start variable, for example, a value of another variable.

The change variable is a variable that is changed by the process program P. The change variable may be referred to as a variable other than the start variable. For example, the change variable is an interruption variable, a busy variable, an end variable, a number indicating a predetermined signal (e.g., the variable "A2.S1" of the process A2), or a variable indicating a midway result of the calculation. The condition for the change variable is a condition for changing the value of the change variable.

The condition setting unit 101 may set any condition as a condition for the start variable and the change variable. For example, the condition setting unit 101 sets, as the conditions, that other variable becomes a predetermined value, that a predetermined signal is received from a device such as a button and a sensor, that the operation state of the industrial device 30 becomes a predetermined state, or that a predetermined time arrives. The setting of a condition is to determine or acquire content of the condition. The condition may be specified by the user or automatically set by a predetermined algorithm.

In this embodiment, the local execution order in the industrial device 30 is specified when a process program P of a new process is generated, and thus the condition setting unit 101 sets the condition of the start variable for the new process. For example, when newly registering the process A1, the condition setting unit 101 sets the variable "IO1.Input1" of the input/output signal as the condition for the start variable of the process A1. When newly registering the process A2, the condition setting unit 101 sets the end variable "A1.End" of the process A1 as the condition for the start variable of the process A2. When newly registering the process A3, the condition setting unit 101 sets the variable "PA2. S1" and the end variable "A2.End" of the process A2 as the conditions for the start variable of the process A3.

If the process B1 is newly registered, the condition for the start variable of the process B1 is not set because it is not specified that the process B1 is executed after the process A3. The condition for the start variable of the process B1 is set when the execution order is specified on the schedule screen G1. For example, when it is specified on the schedule screen G1 that the process B1 is executed after to the process A3, the condition setting unit 101 sets the end variable "A3.End" of the process A3 as the condition for the start variable of the process B1. When newly registering the process B2, the condition setting unit 101 sets the variable "PA2. S1" and the end variable "A1.End" of the process A2 as the conditions for the start variable of the process B3.

The condition for the change variable is also specified when the process program P is generated. The condition setting unit 101 sets the condition specified at the time of generating the process program P as the condition for the change variable. For example, the condition setting unit 101 sets, as a condition for the interruption variable, that a variable indicating occurrence of an error becomes a predetermined value. Further, for example, the condition setting unit 101 sets, as a condition for the busy variable, that the process is not finished after a predetermined period of time has elapsed from the start of the process. Further, for example, the condition setting unit 101 sets, as a condition for the end variable, that the last processing described in the process program P is finished.

In this embodiment, in addition to the default variables such as "Start" and "End", any variable such as "Input1" may be added, and thus the condition setting unit 101 may set a predetermined default variable as at least one of the start variable and the change variable and add a variable specified by the user. That is, at least one of the start variable and the change variable may include not only the default variable but also a variable specified by the user.

For example, if a variable other than the default variable is desired to be set as the condition for starting the process, the condition setting unit 101 may also add a variable specified by the user for the start variable. In this case, the user can specify a variable of any signal, such as "Input1", as the starting variable. The case where the user specifies the change variable is as described above. The condition setting unit 101 does not need to add the variable specified by the user, and does not add the variable when the user does not specify the variable. In this case, only the default variable is set for the newly registered process.

The default variables are not limited to "Start", "End", "Abort", and "Busy" described in this embodiment. The default variable may be any variable. For example, there may be default variables that can be inputs, such as "Stop" to stop the operation, "Pause" to wait or pause the operation, or "Restart" to resume the operation. Further, for example, there may also be default variables that can be outputs, such as "Complete" to indicate completion of the operation, "Ready" to indicate completion of preparation, "Error" to indicate occurrence of an error, and "Timeout" to indicate time-out.

Also, the variable specified by a user is not limited to the examples such as "Input1" described in this embodiment. The variable specified by the user may be any variable. For example, the user may specify a variable that can be input or output, such as a variable indicating the velocity or position of the industrial device or work object (workpiece), a variable indicating the name of the program to be executed by the industrial device, a variable indicating the number of the line or the cell to which the industrial device belongs, or a variable indicating the execution time of the process.

[Process Registering Unit]

The process registering unit 102 is mainly implemented by the CPU 11. The process registering unit 102 stores at least one of the start variable and the change variable set by the condition setting unit 101 as process information in the process database DB in association with the name of the new process. In this embodiment, while both the start variable and the change variable are stored in association with the name of the new process, the process registering unit 102 may store only one of the start variable and the change variable in association with the name of the new process. The process registering unit 102 stores the process information including the name of the new process and the conditions for the start variable and the change variable in the process database DB (execution condition in example of the data storage of FIG. 11). In this embodiment, a name of a new process is specified when the process program P is generated, and thus the process registering unit 102 includes the specified name of the new process in the process information.

[Process Program Generating Unit]

The process program generating unit 103 is mainly implemented by the CPU 11. The process program generating unit 103 generates a process program P. As described with reference to FIG. 3, the process program P itself may be generated in a known language. For example, the process program generating unit 103 generates the process program P by executing a build operation on a ladder chart described by the user. For example, the process program generating unit 103 compiles the code described by the user using the robot language to generate the process program P.

In this embodiment, the start variable is a start condition for executing the process program P, and thus the process program generating unit 103 generates the process program P such that the execution is started when the start variable set by the condition setting unit 101 becomes a predetermined value. For example, when the ladder language is used, the process program generating unit 103 executes the build operation by inserting a start switch or a coil corresponding to the start variable into the ladder chart described by the user. For example, when the robot language is used, the process program generating unit 103 executes the compilation by inserting a conditional branch to be executed when the start variable becomes a predetermined value into the code described by the user.

Further, for example, when the process program P executes the last processing, the process program generating unit 103 generates the process program P so as to change the end variable to a predetermined value. For example, when the ladder language is used, the process program generating unit 103 executes the build operation by inserting a start switch or a coil corresponding to the end variable into the ladder chart described by the user. Further, for example, when the robot language is used, the process program generating unit 103 executes the compilation by inserting an instruction for setting the end variable to a predetermined value when the last processing is completed into the code described by the user. Similarly, regarding the interruption variable and the busy variable, the process program generating unit 103 may generate the process program P so that the interruption variable and the busy variable become predetermined values when predetermined conditions are satisfied.

[Display Control Unit]

The display control unit 104 is mainly implemented by the CPU 11. The display control unit 104 displays the schedule screen G1 that includes plurality of names of the processes acquired from the process database DB storing the process information, in which, for each of the processes executed in the production system 1 having a plurality of industrial devices 30, at least, a name of the process is associated with a variable that is at least referred to or changed in the process program P executed in the process representing the operation of the one or more industrial devices 30 and is capable of specifying the execution order of the plurality of processes.

In this embodiment, the variable is both referred to and changed by the process programs P, although only either reference or change may be made. A variable of a process may be referred to and changed by the process program P of the process, or may be referred to and changed by another process program P or system program Q. To associate the process name with the variable is to include the process name and the variable in the same process information or to link them to each other.

The schedule screen G1 capable of specifying the execution order is a screen having a user interface capable of specifying the execution order. The execution order may be specified by any method, and the layout of the schedule screen G1 is not limited to the examples of FIGS. 4 to 8. For example, the schedule screen G1 may have the layout as shown in FIG. 9, or a layout in a table format instead of a timing chart format as in the modification example described later. Further, for example, the schedule screen G1 may have another layout such as a flowchart format.

In this embodiment, the display control unit 104 displays the timing chart C as the schedule screen G1 based on the execution order received by receiving unit 105 and the names and variables of the respective processes included in the execution order. In this embodiment, the process database DB stores the execution order, the name of the process, and the variable are stored as the process information, and thus the display control unit 104 displays the timing chart C based on the process information in the process database DB.

The timing chart C is a chart showing the execution order of the processes. In other words, the timing chart C is a chart showing the execution timing of the processes in time series. The timing chart C shows information for identifying the processes in time series. For example, the timing chart C shows the names of the processes in time series. Further, for example, the process images I indicating the execution timing of the processes are arranged in time series in the timing chart C. The information for identifying the process may be information other than the name of the process or an image (e.g., icon) other than the process image I. The execution order of the processes may be specified by numerical values of the execution order stored in the process information, or by variables and execution conditions stored in the process information.

The information for identifying the process may be arranged in any direction, for example, from top to bottom, from left to right, from bottom to top, or from right to left. In this embodiment, the names of the processes are arranged from top to bottom in time series. The process images I are arranged from left to right in time series. For example, the display control unit 104 specifies the process names and the execution order by referring to the process information stored in the process database DB, and displays the timing chart C in which the name of the process are arranged from top to bottom in the execution order and the process images I are arranged from left to right in the execution order.

In the timing chart C, the names of the plurality of processes included in the execution order are arranged on a process axis. The process axis is a direction in which the names of the processes are arranged. In this embodiment, the process axis is oriented from top to bottom, although the process axis may be oriented in any predetermined direction, for example, from left to right, from bottom to top, or from right to left. The names of the processes are arranged in time series on the process axis. In the example of FIG. 7, the execution order is specified so that the processes A1, A2, A3, B1, and B2 are executed in this order, and thus these names are arranged in the direction from top to bottom, which is the process axis.

Further, for example, the timing chart C displays the process images I, which indicate the execution of the respective processes by the lengths on a timing axis perpendicular to the process axis, at substantially the same positions of the process names on the process axis and in the execution order on the timing axis. The timing axis may also be referred to as a time axis. In this embodiment, the timing axis is oriented from left to right, although the timing axis may be angled from the process axis by 90°, and may be, for example, from right to left. For example, if the process axis is from left to right, the timing axis may be from top to bottom.

The process image I and the name of the process are arranged at substantially the same position on the process axis. Substantially the same position on the process axis is that there is no displacement in the process axis direction or that it is small enough to be regarded as no displacement. The small displacement means the displacement less than a predetermined distance, e.g., less than 1 centimeter, or less than 10 pixels. As shown in FIG. 7, the process images I of the processes A1, A2, A3, B1, and B2 are arranged so as to have substantially the same heights as the names of corresponding processes and to be in the order of execution on the timing axis. The display control unit 104 arranges the process images I of the processes so as to be aligned in time series in the timing axis direction. When the same process is repeatedly executed as in this embodiment, the process images I are arranged on the different timing axis on the same process axis.

In this embodiment, the process information of a process includes an estimated execution time of the process. The display control unit 104 sets a length of a process image I on the timing axis (i.e., the length of the process image I in the timing axis direction) to a length corresponding to the estimated execution time. The length corresponding to the estimated execution time may be a length proportional to the estimated execution time, or a length that conceptually captures the length of the estimated execution time. For example, the longer the estimated execution time, the longer the process image I becomes in the timing axis direction. For each process, the display control unit 104 determines a length of a process image I of a process based on an estimated execution time included in the process information of the process.

The relationship between the estimated execution time and the length of the process image I is not limited to the above example. For example, if the estimated execution time of a certain process is 10 seconds and the other two processes are 2 seconds and 1 second, respectively, the process images I of the processes of 1 second and 2 seconds may be displayed in proportion to the lengths thereof, and the process of 10 seconds may be displayed in a shortened manner without being proportional to the lengths thereof. This helps to conceptually grasp the execution order and improve the listability of the execution order. Further, the process image I may not have a length corresponding to the estimated execution time. For example, if the estimated execution time is omitted, the process image I may have a fixed length. As another example, a numerical value indicating an estimated execution time may be displayed in the process image I of a fixed length.

For example, the display control unit 104 moves the process image I in the timing chart C based on a movement instruction. The movement instruction is an instruction for moving the process image I. In this embodiment, a drag-and-drop operation is described as an example of the movement instruction, although the movement instruction may be any other operation, such as, clicking or tapping. Further, for example, the movement instruction may not be an operation on the process image I, and may be an operation of clicking or tapping a position of a destination of the process image I. As another example, the movement instruction may be an operation of pressing an arrow button on the keyboard.

In this embodiment, the process image I is moved and the execution order of the process is thereby specified, and thus the movement instruction may be referred to as an operation for specifying the execution order. the display control unit 104 moves the process image I to the destination designated by the moving instruction. The execution order of the processes is also changed in accordance with the order of the process images I. The execution order of each process is changed so that the order of the process images I on the timing axis is matched with the order of execution. The order of execution may be changed by a system program generating unit 106, which will be described later, or may be changed by the display control unit 104.

In this embodiment, the process database DB stores the names of the plurality of industrial devices 30 in association with the process information of the plurality of processes to be executed by the industrial devices 30, and the display control unit 104 displays a list L of the names of the industrial devices 30 on the schedule screen G1. The industrial devices 30 listed in the list L are all or some of the industrial devices 30 to be controlled by the controller 20. In this embodiment, the industrial devices 30 to be controlled are defined in the process database DB, and thus the display control unit 104 refers to the process database DB and displays the list L of the industrial devices 30. The list L is a list of the names of the industrial devices 30, and the order of names may be freely determined. For example, in the list L, the names of the industrial devices 30 may be arranged in word order (e.g., alphabetical order) or in order of registration in the process database.

The user can select the name of the industrial device 30 from the list L, and further, the display control unit 104 arranges the process images I of the processes associated with the selected industrial device 30 on the process axes of the timing chart C. The display control unit 104 obtains the process information associated with the industrial device 30 selected by the user from the process database DB, and specifies the processes executed by the industrial device 30 and its execution order. The display control unit 104 arranges the process image I of the specified process on the process axis of the timing chart c in the specified execution order.

For example, when the user selects the industrial device 30A in the list L in the state of FIG. 4, the display control unit 104 arranges the process images I1, I2, and I3 of the respective processes A1, A2, and A3 on the process axis of the timing chart C based on the process information of the industrial device 30A. In this case, the timing chart C is in the state of FIG. 5, and each of the process images I1, I2, and I3 is aligned from top to bottom on the process axis. Subsequently, if the user selects the industrial device 30B in the list L, the display control unit 104 arranges the process images I4 and I5 of the respective processes B1 and B2 on the process axes of the timing chart C based on the process information of the industrial device 30B. In this case, the timing chart C is in the state shown in FIG. 6, and each of the process images I4 and I5 is aligned from top to bottom on the process axis.

[Receiving Unit]

The receiving unit 105 is mainly implemented by the CPU 11. The receiving unit 105 receives a specification of the order of execution on the schedule screen G1 displayed by the display control unit 104. In this embodiment, the receiving unit 105 receives the moving instruction for moving the process image I in the timing chart C on the timing axis as the specification of the execution order. The execution order may be specified by any operation, and may be specified by an operation other than the movement instruction. For example, the execution order may be specified by an operation for entering a numerical value indicating the execution order in the input form or an operation for selecting the execution order from the pull-down menu.

The receiving unit 105 receives a selection of a name of the industrial device 30 from the list L. The receiving unit 105 receives the specification of the execution order of the processes of the industrial equipment 30 selected from the list L. In this embodiment, even if a name of an industrial device 30 is displayed in the list L, the industrial devices 30 is not controlled by the system program Q unless the user selects the display device 30. The receiving unit 105 may receive the selection of the names of all the industrial devices 30 in the list L, or may receive the selection of only some of the industrial devices 30 in the list L. In this embodiment, the name in the list L is selected by the drag-and-drop operation, although the name may be selected by any other operation. For example, the name of the industrial device 30 may be selected by clicking or tapping the name in the list L.

The receiving unit 105 receives the specification of repetitive operations of the plurality of industrial devices 30 on the schedule screen G1. The repetitive operation is a periodic operation of the industrial device 30. The specification of the repetitive operation is to specify the execution timing of the repetitive operation. In this embodiment, a case will be described in which the specification of the start timing of the second cycle corresponds to the specification of the repetitive operation, although the specification of the repetitive operation may be the specification of any start timing of the third cycle or later.

In this embodiment, the repetitive operation is specified by specifying any position on the timing chart C, although the repetitive operation may be specified by any other operation. For example, the repetitive operation may be specified by specifying other process (in the example of FIG. 7, process B1 indicated by process image I4) as a start condition for the first process in the second cycle. Further, for example, the repetitive operation may be specified by inputting a numerical value of the start timing of the second cycle.

[System Program Generating Unit]

The system program generating unit 106 is mainly implemented by the CPU 11. The system program generating unit 106 generates a system program Q that operates the respective industrial devices 30 in the specified execution order based on the execution order received by the receiving unit 105 and the variables of each process included in the execution order. The system program generating unit 106 generates the system program Q that controls variables of the respective processes so that the respective processes are executed in the specified execution order.

In this embodiment, variables of a process include the start variable indicating the start of execution of such a process. The system program generating unit 106 generates the system program Q by associating a change variable changed in at least one process with a start variable of one or more other processes executed in conjunction with the one process in the execution order so that the processes according to the execution order are sequentially executed. To associate a change variable with a start variable means that a value of the change variable is a condition for changing a value of the start variable. For example, the end variable "A1.End" of the process A1 is a condition for changing the start variable "A2. Start" of the process A2, and thus, these variables are associated with each other in the system program Q.

For example, the system program generating unit 106 generates the system program Q by associating a start variable of another process corresponding to a process image I moved by the display control unit 104 with a change variable of one process corresponding to a process image I placed immediately before the another process on the timing axis. Immediately before on the timing axis is the most recent process image I in time. In the example of FIG. 7, the process images I1, I2, I3, and I4 are respectively positioned immediately before the process images I2, I3, I4, and I5.

In this embodiment, the process A1 is the first process to be executed, an end variable of another process is not the condition for start in the first cycle. For example, when the variable "OI1.Input1" indicating a predetermined input/output signal becomes a predetermined value, the system program generating unit 106 generates the system program Q such that the start variable of the process A1 is a predetermined value.

Further, for example, the process image I2 of the process A2 is positioned immediately after the process image I1 of the process A1, and thus the system program generating unit 106 generates the system program Q such that the start variable "A2. Start" of the process A2 becomes a predetermined value when the end variable "A1. End" of the process A1 becomes a predetermined value. Further, for example, the process image I3 of the process A3 is positioned immediately after the process image I2 of the process A2, and thus the system program generating unit 106 generates the system program Q such that the start variable "A3 Start" of the process A3 becomes a predetermined value when the variable "A2.S1" of the process A2 becomes a predetermined value and the end variable "A2.End" of the process A2 becomes a predetermined value.

Further, for example, the process image I4 of the process B1 is positioned immediately after the process image I3 of the process A3, and thus the system program generating unit 106 generates the system program Q such that the start variable "B1. Start" of the process B1 becomes a predetermined value when the end variable "A3. End" of the process A3 becomes a predetermined value. Further, for example, the process image I5 of the process B2 is positioned immediately after the process image I4 of the process B1, and thus the system program generating unit 106 generates the system program Q such that the start variable "B2. Start" of the process B2 becomes a predetermined value when the end variable "B1. End" of the process B1 becomes a predetermined value.

Assume that a program for generating the system program Q is stored in the data storage unit 100. For example, the system program generating unit 106 generates the system program Q by executing the build operation. The instructions for executing the above processing may be described by, for example, a start switch or a coil in the ladder language, or may be described by instructions of conditional branches in the robot language. In addition to the build, the system program generating unit 106 may generate the system program Q using a compiler, for example. Further, the change variable associated with the start variable is not limited to the end variable. For example, similarly to the start variable "A3.Start" of the process A3, not only the end variable "A2.End" of the process A2 but also the variable "A2.S1" of the signal of the process A2 may be associated with the start variable.

The system program generating unit 106 generates the system program Q that operates the industrial devices 30 with the specified repetitive operation based on the repetitive operation received by the receiving unit 105. For example, the system program generating unit 106 determines the start timing of the second and subsequent cycles so as to perform the repetitive operation specified by the user.

In the example of FIG. 8, the system program generating unit 106 associates the start variable of the process A1 in the second and subsequent cycles with the end variable of the process B1. As a result, the process A1 in the second and subsequent cycles is started when the process B1 of the preceding cycle is finished, and the processes are executed in the execution order as shown in the timing chart C of FIG. 8. The system program generating unit 106 generates the system program Q such that the start variable "A1.Start" of the process A1 in the second cycle is changed when the end variable "B1.End" of the process B1 becomes a predetermined value instead of the variable "IO1.Input1" of the input/output signal. The system program generating unit 106 generates the system program Q so as to execute the same processing as in the first cycle for the subsequent processing.

[3-2. Functions Implemented by Controller]

As shown in FIG. 10, a data storage unit 200 and a system program executing unit 201 are implemented in the controller 20.

[Data Storage Unit]

The data storage unit 200 is implemented mainly by the storage unit 22. The data storage unit 200 stores data required to control the execution order of the processes. For example, the data storage unit 200 stores the system program Q. The system program Q stored in the data storage unit 200 is generated by the program generating device 10. For example, the data storage unit 200 may store the names and IP addresses of the industrial devices 30A and 30B to be controlled by the controller 20. For example, the data storage unit 200 may store the process database DB. For example, the data storage unit 200 may store values of variables of the industrial devices 30. Assume that the variables of the data storage unit 200 and the variables of the data storage unit 300 are periodically matched.

[System Program Executing Unit]

The system program executing unit 201 is mainly implemented by the CPU 21. The system program executing unit 201 controls the execution order of the processes based on the system program Q. For example, the system program executing unit 201 sends an instruction to start each process to each industrial device 30 so that each industrial device 30 operates in the execution order specified by the user. For example, the system program executing unit 201 periodically refers to a change variable of each industrial device 30, and when the change variable of a certain process becomes a predetermined value, changes the start variable of the next process to a predetermined value. The system program executing unit 201 returns the start variable of the next process to the initial value at any timing after the next process starts. Thereafter, the execution order of the processes is controlled by the same processing.

[3-3. Functions Implemented by Industrial Device]

As shown in FIG. 10, a data storage unit 300 and a process program executing unit 301 are implemented in the industrial device 30.

[Data Storage Unit]

The data storage unit 300 is implemented mainly by the storage unit 32. The data storage unit 300 stores data required for the industrial equipment 30 to execute the processes. For example, the data storage unit 300 stores the process program P. In this embodiment, the process information is prepared for each process program P, and thus the data storage unit 300 may store the process program P and the process information in association with each other. The data storage unit 300 stores the values of the variables of the respective processes. As described above, the variables of the data storage unit 300 and the variables of the data storage unit 200 are consistent with each other. Further, the data storage unit 300 may store parameters for controlling the motor and teaching data of the robot, for example.

[Process Program Executing Unit]

The process program executing unit 301 is mainly implemented by the CPU 31. The process program executing unit 301 executes the processes based on the process program P and variables stored in the data storage unit 300. For example, in response to an instruction received from the controller 20, a start variable of each process changes to a predetermined value, and the process program executing unit 301 starts the process when detecting the change. Further, for example, when the last processing described in the process program P of the process ends, the process program executing unit 301 changes the end variable of the process to a predetermined value. When the system program Q detects that the end variable of the process becomes a predetermined value, the start variable of the next process changes to a predetermined value, and the process program executing unit 301 starts execution of the process program P of the next process. Thereafter, the respective processes are sequentially executed by the same processing.

4. Processing Executed by Program Generating Device

Next, the processing executed in the program generating device 10 will be described. In this embodiment, the processing of generating the process program P and the processing of generating the system program Q will be described. Such processing is performed by the CPU 11 operating in accordance with the program (e.g., engineering tool) stored in the storage unit 12. The processing shown in FIGS. 12 and 13 is an example of the processing executed by the functional blocks shown in FIG. 10.

[4-1. Processing of Generating Process Program]

Figure 12:
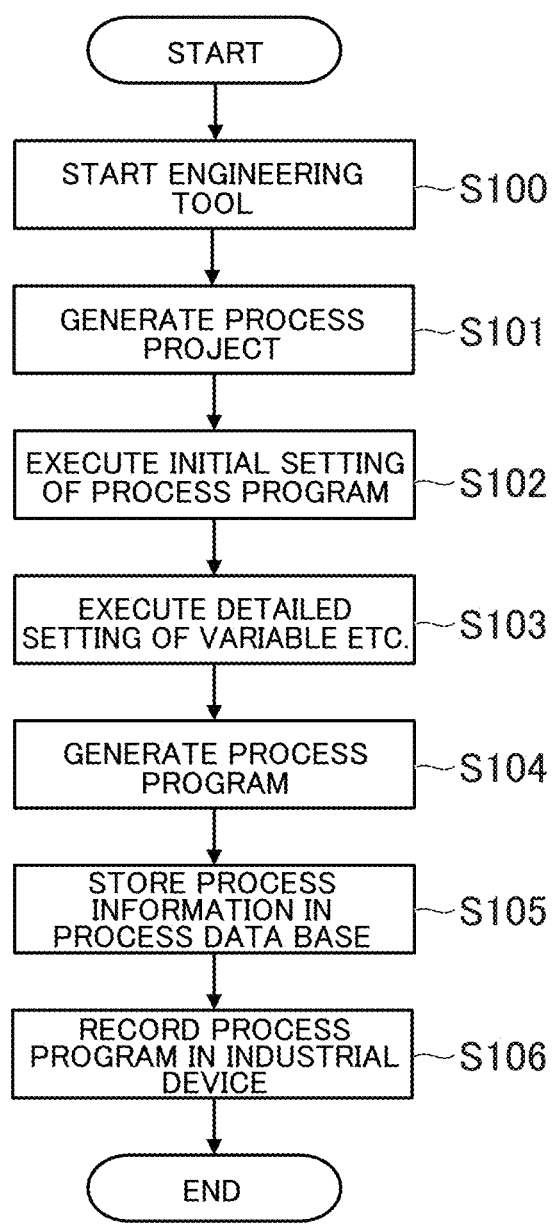
FIG. 12 is a flow chart showing an example of processing of generating the process program.
Figure 13:
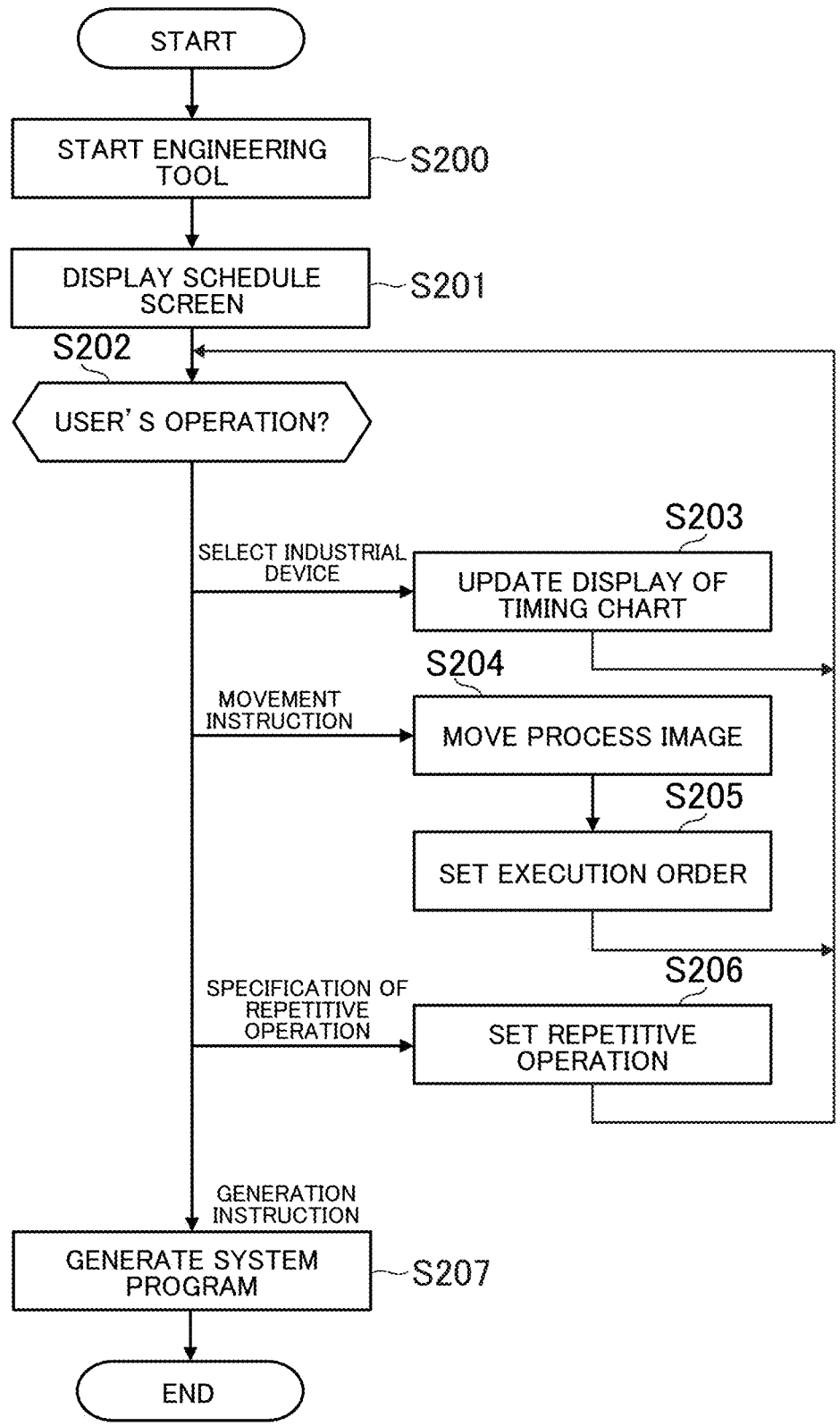
FIG. 13 is a flow chart showing an example of processing of generating the system program.

FIG. 12 is a flow chart showing an example of processing of generating the process program P. As shown in FIG. 12, the CPU 11 starts the engineering tool (S100) and generates a process project of a new process based on the user's operations (S101). In S101, the user inputs a name of the industrial device 30 that executes the process and a name of the new process from the operation unit 14, and generates the process project.

The CPU 11 executes initial setting of the process program P of the new process based on the user's operation (S102). In S102, the CPU 11 sets defaults for the new process and receives a process name and an estimated execution time, for example, from the user.

The CPU 11 executes detailed settings, such as variables, based on the user's operation (S103). In S103, the CPU 11 receives the specification of variables other than the default variables and the specification of the execution order in the industrial device 30, for example.

The CPU 11 executes the process programming based on the user's operation and generates the process program P (S104). In S104, the process programming using any language such as the ladder language or the robot language is executed, and the process program P is generated.

The CPU 11 generates process information of the new process and stores the information in the process data base DB (S105). In S105, the CPU 11 generates a new record in the process database DB and registers the process information of the new process in association with the name of the industrial device 30 in which the new process is generated.

The CPU 11 records the process program P generated in S104 in the industrial device 30 (S106), and the processing terminates. In S106, the CPU 11 records the process program P in the storage unit 32 of the industrial device 30 that executes the new process.

[4-2. Processing of Generating System Program]

FIG. 13 is a flow chart showing an example of processing of generating the system program Q. As shown in FIG. 13, the CPU 11 starts the engineering tool (S200) and displays the schedule screen G1 on the display unit 15 based on the process database DB (S201). The schedule screen G1 in S201 is as shown in FIG. 4, and the list L shows the names of the industrial devices 30 to be controlled by the controllers 20 (the industrial devices 30 with process information registered in the process database DB).

The CPU 11 specifies the operation of the user based on the detect signal of the operation unit 14 (S202). Here, a case will be described in which selection of the name of the industrial device 30 from the list L, the movement instruction of the process image I, the specification of the repetitive operation, or the instruction of generating the system program Q is performed.

In S202, if the name of the industrial device 30 in the list L is selected (S202; selection of industrial device), the CPU 11 updates the display of the timing chart C based on the process information of the industrial device 30 selected by the user (S203). In S203, the CPU 11 displays the name of the industrial device 30 selected by the user, and updates the display of the timing chart C so that the name of the process and the estimated execution time are arranged on the process axis and the process image I of the length corresponding to the estimated execution time is arranged on the timing axis. The schedule screen G1 in S203 is as shown in FIG. 5. If a plurality of industrial units 30 are not selected, the name of the industrial device 30 in the list L is again selected, and the processing of S103 is executed.

In S202, if the movement instruction of the process image I is performed (S202; movement instruction), the CPU 11 moves the process image I based on the movement instruction (S204) and sets the execution order of the process (S205). In S205, the CPU 11 updates the process data base DB according to the execution order specified by the movement instruction. For example, the CPU 11 associates the start variable of the process in the later execution order with the end variable of the process in the earlier execution order. The display of the timing chart C changes from the state of FIG. 6 to the state of FIG. 7.

If the repetitive operation is specified in S202 (S202; specification of repetitive operation), the CPU 11 performs setting of the repetitive operation (S206). In S206, the CPU 11 updates the timing chart C so that the second cycle starts at the start timing specified by the user. The CPU 11 updates the process database DB so that the end variable of any process in the first cycle is associated with the start variable of the first process in the second cycle.

In S202, if an instruction to generate the system program Q is issued (S202; generation instruction), the CPU 11 generates the system program Q based on the process information of the process database DB (S207), and this processing terminates. In S207, the CPU 11 executes the build operation described above and generates the system program Q. The system program Q is written to the controller 20 at any timing.

According to the program generating device 10 in this embodiment, the system program Q that operates each industrial device 30 in the specified execution order is generated based on the execution order of the plurality of processes received in the schedule screen G1 and the variables of the respective processes included in the execution order. This serves to simplify the generation of the system program Q. For example, in the conventional technique, a user needs to generate a ladder chart of the PLC at any time. According to the program generating device 10, however, the user may specify the execution order of a plurality of processes on the schedule screen G1, and thus a program can be generated by a simpler operation.

Further, it is possible to generate the system program Q that executes one process and other process in conjunction with each other by associating the change variable changed in at least one process with the start variable of one or more other processes executed in conjunction with the one process in the execution order so that the processes according to the execution order specified on the schedule screen G1 are sequentially executed. For example, the change variable that is changed in one process executed before another process may be set as a condition for starting another process.

Further, at least one of the start variable and the change variable set for the new process that is not registered in the process database DB is stored as the process information in the process database DB in association with the new process, and thus, even if a new process is added, the execution order of the new process can be specified on the schedule screen G1, and the system program Q can be generated in further simplified manner.

Further, the timing chart C, in which the names of the processes included in the execution order are arranged on the process axis and the process images I indicating the execution of each of the processes by a length on the timing axis orthogonal to the process axis are arranged at substantially the same positions of the names of the respective processes on the process axis and in the execution order on the timing axis, is displayed as the schedule screen G1. This enables to provide the schedule screen G1 in which the execution order of the processes can be easily grasped intuitively.

Further, the length of the process image I on the timing axis is set to the length corresponding to the estimated execution time. This provides the schedule screen G1 in which the estimated execution time can be intuitively grasped.

Further, the movement instruction for moving the process image I on the timing axis in the timing chart C is received as the specification of the execution order, and the execution order of the processes can be thereby specified by a more intuitive operation.

Further, the list L of the names of the industrial devices 30 is displayed and the process images I of the respective processes associated with the selected industrial devices 30 are arranged on the process axis of the timing chart C. With this arrangement, the industrial device 30 for which the execution order is to be specified can be freely selected, and the system program Q can be generated in further simplified manner.

Further, in the schedule screen G1, the specification of the repetitive operation of each of the industrial devices 30 is received and the system program Q for operating each of the industrial devices 30 in the specified repetitive operation is generated. This can simplify the generation of the system program Q for causing each of the industrial devices 30 to execute the repetitive operation.

5. Modification Examples

The present invention is not to be limited to the above described embodiment. The present invention can be modified as appropriate without departing from the spirit of the invention.

(1) For example, the process program P may be generated by using a program generated by a tool other than the engineering tool described in the embodiment. In this modification example, a case where a program generated by another tool is converted to generate a process program P will be described. In this modification example, the case where the process program P is generated by converting the program generated in the ladder language will be described, although the process program P is generated by the same procedure when the program generated in another language, such as the robot language, is converted.

FIG. 14 is a diagram illustrating a procedure for converting a program generated by an existing tool. Here, an example of the procedure when the process program PA1 is generated by conversion will be described. As shown in FIG. 14, the display control unit 104 displays a series program screen G2 for specifying a part of the series of programs generated already corresponding to the process program P (step 1 in FIG. 14).

The series of programs generated already is a program generated by other tools. Assume that the series of programs generated already are stored in advance in the data storage unit 100. The other tools may be various well-known tools, for example, a tool that can be programmed in ladder or robot languages. However, the other tools cannot be programmed by specifying variables similarly to the engineering tool described in the embodiment. In the series of programs generated already, variables for executing the process are not specified, and the start condition of the process and an operation output are described by the ladder chart, for example. An instruction of at least one process is described in the series of programs generated already.

The part corresponding to the process program PA1 is a part that is a target of the process program PA1 in the series of programs generated already. The part corresponding to the process program P may also be referred to as a part to be converted (reused) or a part for which the start and the end is controlled by variables in the series of programs generated already. Any part of the series of programs generated already is apart corresponding to the process program PA1. For example, all of the series of programs generated already may be the part corresponding to the process program PA1.

The series program screen G2 is a screen for displaying the content of the series of programs generated already. For example, in the case of the ladder language, a ladder chart of the series of already generated programs is displayed on the series program screen G2. Further, for example, in the case of a robot language, codes of a series of programs generated already are displayed on the series program screen G2. The series program screen G2 is not limited to these examples, and may be any screen on which the content of the series of programs generated already are displayed. For example, the series program screen G2 may be a screen on which individual processing of the series of programs generated already are displayed in the form of a flowchart.

The receiving unit 105 receives specification of a part corresponding to the process program PA1 in the series program screen G2 displayed by the display control unit 104 (step 2 of FIG. 14). The user specifies any part of the series of programs generated already on the series program screen G2. In the example of FIG. 14, a case will be described in which a part corresponding to the process program. PA1 is specified by selecting a range in the series program screen G2, although the part may be specified by any other operation. The user specifies a target part of the process program P (i.e., a part for which operation is controlled by a variable). For example, the user specifies a part corresponding to the start variable and a part corresponding to the end variable in the series of programs generated already. Further, for example, the user specifies a part corresponding to the interruption variable and a part corresponding to the busy variable in the series of programs generated already.

The process program generating unit 103 generates a new process program PA1 corresponding to a new process based on the part of the series of programs specified in the receiving unit 105 and at least one of the start variable and the change variable set by the condition setting unit 101 (step 3 in FIG. 14). In the present modification example, assume that the start variable and the change variable are set in advance by the condition setting unit 101. These setting methods are as described in the embodiment.

The process program generating unit 103 inserts a start switch and a coil, which correspond to the start variable and the change variable, in the part of the series of programs specified by the user, and generates a new process program PA1. By inserting the start switch and the coil, for example, an operation is started by the start variable set by the condition setting unit 101, and the change variable set by the condition setting unit 101 controls the end and the interruption of the operation. The new process programs P may be stored in the data storage unit 200 of the controller 20, or in the data storage unit 300 of the industrial device 30. When converting the series of programs generated using the robot language, a new process program PA1 may be generated by inserting conditional branches or instructions for changing the start variable and the change variable into the part of the series of programs specified by the user.

Either the specification of the part of the series of programs or the setting of a condition of at least one of the start variable and the change variable may be performed first. In other words, the variable may be set after the ladder is cut out, for example, instead of cutting out and associating the ladder after the variable is set. For example, the specification of the part of the series of programs may be performed before the setting of the conditions of the start variable and the change variable. In this case, the user sets the condition of at least one of the start variable and the change variable after specifying the part of the existing series of programs corresponding to the process program. Further, for example, the setting of the conditions of the start variable and the change variable may be performed before the part of the series of programs is specified. In this case, after setting the condition of at least one of the start variable and the change variable, the user specifies the part of the existing series of programs corresponding to the process program.

According to the modification example (1), a new process program P corresponding to a new process is generated based on the part of the series of programs generated already and at least one of the start variable and the change variable that are set, and thus, it is possible to generate a new process program P by reusing the series of programs generated already, which serves to reduce the labor of generating a new process program P.

(2) Further, for example, the controller 20 may perform a predetermined calculation on a variable of an industrial device 30, and control a process of other industrial devices 30 based on a result of the calculation. Hereinafter, a program for performing the calculation is referred to as a calculation program. In this modification example, the calculation program may be executed by the controller 20, although the calculation program may be executed by another computer, such as the server 40. For example, the calculation program may be executed separately, for example, the controller 20 executes the calculation program in the normal processing, and the server 40 executes the calculation program in the calculation related to the operation analysis and recovery operation when an error occurs.

Figure 15:
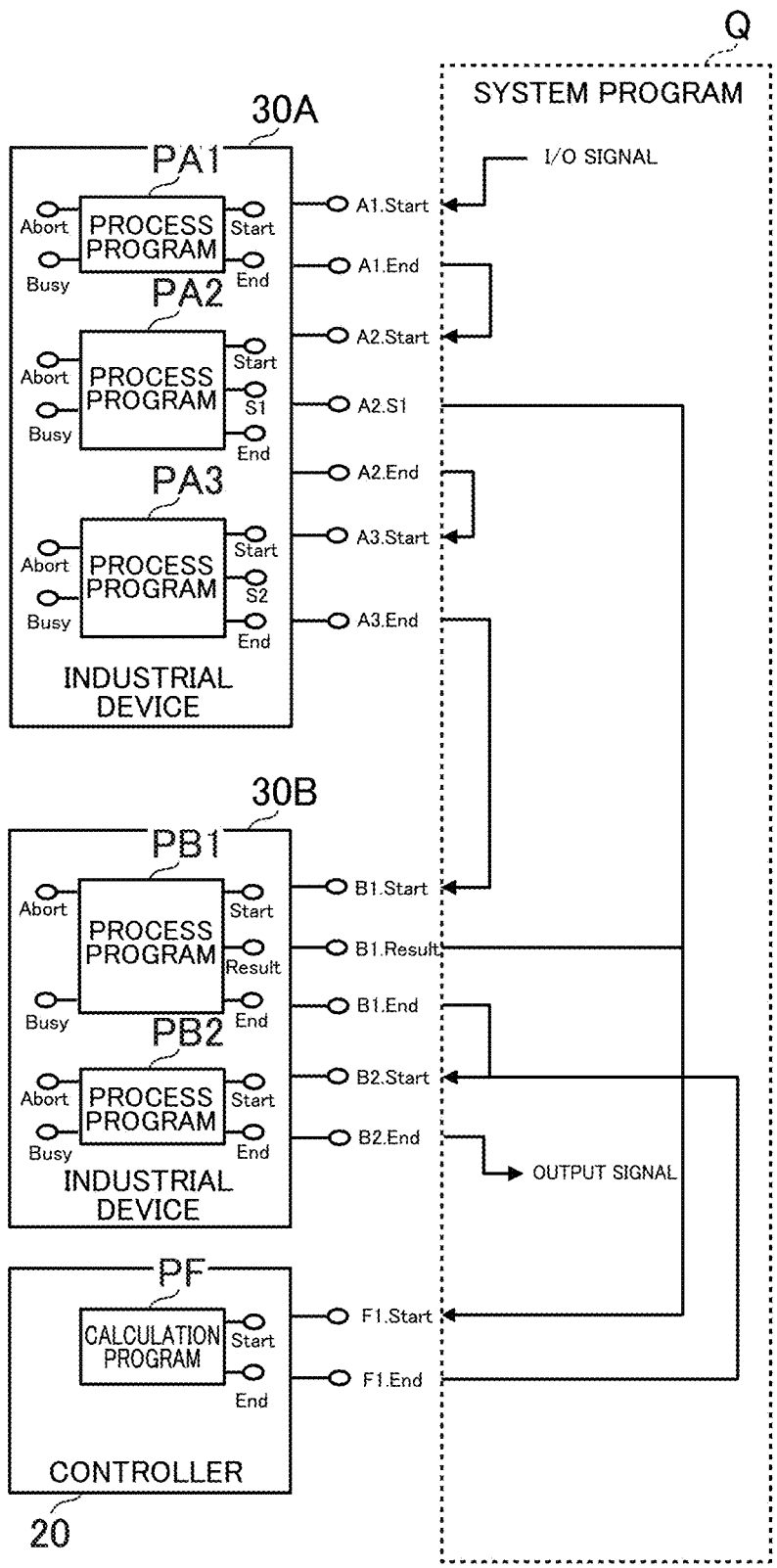
FIG. 15 is a diagram illustrating an example of processing of a calculation program.

FIG. 15 is a diagram illustrating an example of processing of the calculation program. In the example shown in FIG. 15, the controller 20 executes a calculation program PF and executes a calculation process F. The calculation process F is not a physical operation performed in the industrial device 30, but only a calculation process inside the controller 20 is performed, although in the present modification example, the calculation process F is treated the same as the process of the industrial device 30 and referred to as a calculation process.

For example, the calculation program PF is generated in the same procedure as the process program P. As such, the start variable and the end variable are also set for the calculation process F. In the example of FIG. 15, the start variable "F1. Start" of the calculation process F changes when each of the variable "A2. S1" of the process A2 and the variable "B1. Result" of the process B1 becomes a predetermined value, and the calculation process F starts. Other variables such as the interruption variable and the busy variable may also be set for the calculation process F.

For example, the calculation program PF performs a predetermined calculation on the variable "A2.S1" of the process A2 and the variable "B1.Result" of the process B1. If the calculation result is a predetermined result, the end variable "F1.End" of the calculation process F becomes a predetermined value. In the example of FIG. 15, the start variable of the process B2 changes when each of the end variable "B1.End" of the process B1 and the end variable "F1.End" of the calculation process F becomes a predetermined value, and the process B2 starts. The calculation program PF may output the calculation result to the process program P. In the example of FIG. 15, the calculation program PF may output the calculation result to the process program PB2.

Regarding the calculation process F, the same process information as that of the other processes is prepared, and the process database DB stores the process information of the calculation process F. FIG. 16 is a diagram showing an example of data storage of the process database DB of the modification example (2). As shown in FIG. 16, the process database DB of the present modification stores the variable to be referenced as the process information, and stores the name of the process corresponding to the calculation processing for outputting the result to the variable to be changed and the variable associated therewith.

The variable to be referenced is a variable referenced by the calculation program PF. The variable to be referenced may be a variable of the calculation process F, or a variable of a process other than the calculation process F. In the example of FIG. 16, the calculation program PF refers to the variable "A2.S1" of the process A2 and the variable "B1.Result" of the process B1, and thus these variables are stored in the process information of the calculation process F.

The variable to be changed is a variable that is changed by the calculation program PF. The variable to be changed may be a variable of the calculation process F, or may be a variable of a process other than the calculation process F. The data storage example of FIG. 16 shows that the end variable "F1.End" of the calculation process F becomes a predetermined value according to the calculation result of the calculation process F, and the process B2 starts. For example, the process information of the calculation process F stores the condition of the start variable "F1.Start" and the end variable "F1.End" of the calculation process F. In a case where the calculation program PF outputs the calculation result to change a variable of other process, the variable of the other process corresponds to a variable to be changed.

When a process corresponding to calculation processing is included in the execution order received by receiving unit 105, the display control unit 104 of the present modification displays the process image I of the process corresponding to the calculation processing together with the other process images I. The schedule screen G1 of the present modification may have the same layout as described in the embodiment, and the process image I of the calculation process F is displayed therein.

For example, in the timing chart C of FIG. 7, the process image I of the calculation process F is displayed on the row of the industrial device 30A. The calculation process F is executed between the process B1 and the process B2, and thus these process images I are displayed such that the process B1, the calculation process F, and the process B2 are arranged in this order on the timing axis. The process image I of the calculation process F may have a length corresponding to the estimated execution time or may have a fixed length, similarly to the process images I of the other processes.

The process image I of the calculation process F may be displayed at any position in the timing chart C, such as between the industrial devices 30A and 30B or under the industrial device 30B. The process image I may be displayed in the timing chart C in the execution order of the normal process and the calculation process F.

According to the modification example (2), when a calculation process F corresponding to calculation processing is included in the specified execution order, a process image I of the calculation process F is displayed together with the other process images I, whereby the calculation process F is treated the same as other processes on the schedule screen G1, and the system program Q can be generated in further simplified manner.

(3) Further, for example, the layout of the schedule screen G1 is not limited to the timing chart format, and a table-type user interface may be displayed to specify the execution order of the processes.

Figure 17:
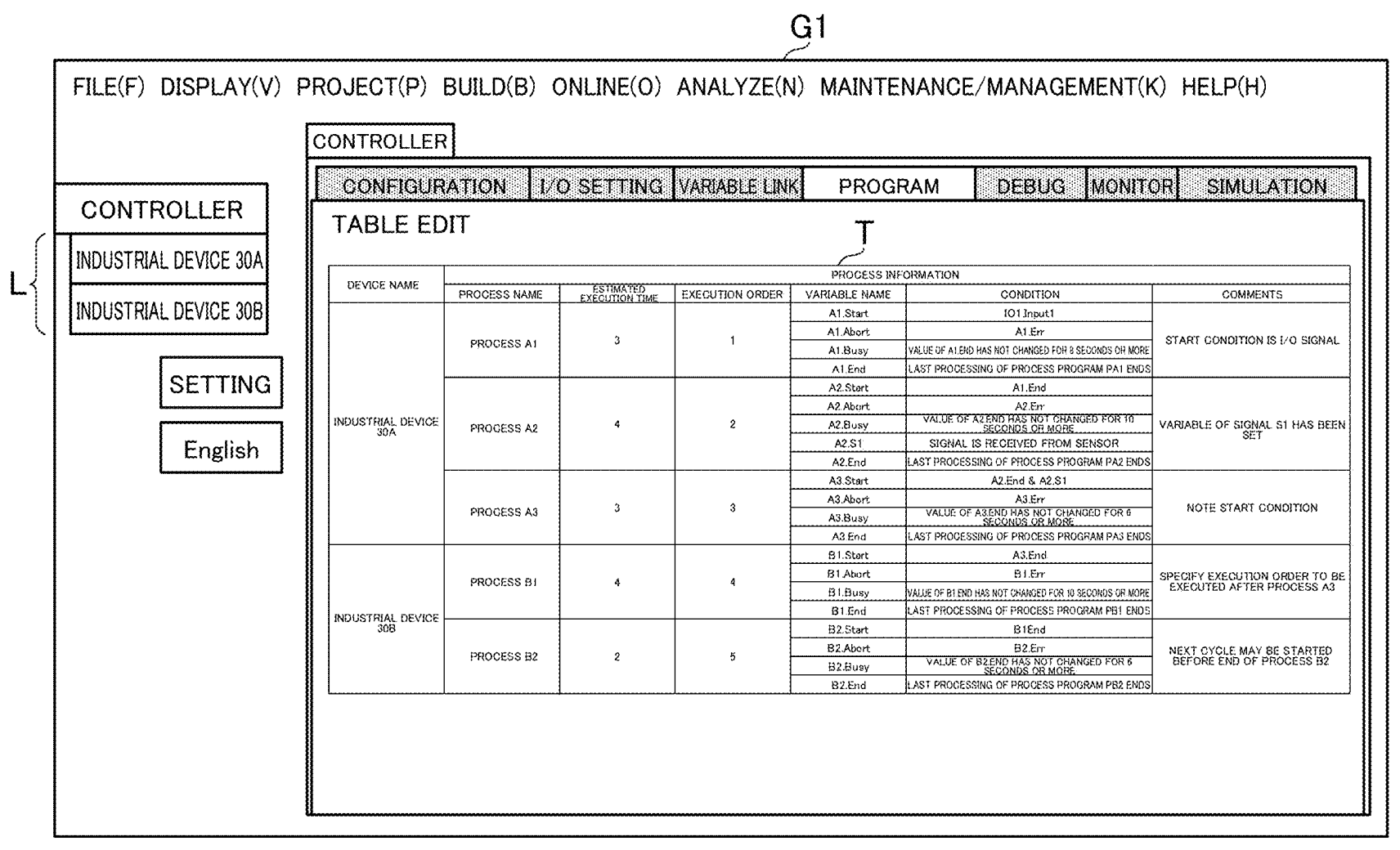

FIG. 17 is a diagram illustrating an example of the schedule screen G1 of the modification example (3). As shown in FIG. 17, the display control unit 104 displays a table T as the schedule screen G1 based on the execution order received by the receiving unit 105 and the processes and variables included in the execution order. The table T displays the process information of each process in a tabular format, such as, the name of the industrial device 30, the name of the process, the estimated execution time, the execution order, the name of the variable, the execution condition, and the comments.

For example, in the table T, the names and variables of the respective processes included in the execution order are arranged in the column direction or the row direction. The column direction is a direction from top to bottom, or a direction from bottom to top. The row direction is a direction from left to right or from right to left. In the example of FIG. 17, the names and variables of the respective processes are arranged in the column direction.

In the schedule screen G1, the timing chart C described in the embodiment and the table T of the present modification may be switched. For example, the table T may be displayed when the user double-clicks on the timing chart C, and the timing chart C may be displayed when the user double-clicks on the table T. In this case, when the user specifies the execution order of the processes on the table T, such execution order is also reflected in the timing chart C.

The user inputs information into each cell of the table T, thereby specifying the execution order of the process. For example, the user may enter a numerical value in a cell of the execution order, or may enter a name of a conditional variable in a cell of the execution condition. The system program Q may be generated so that each process is executed in the execution order specified by the user as described in the embodiment.

According to the modification example (3), the table T is displayed as the schedule screen G1, which makes it easy to intuitively grasp the execution order of each process.

(4) For example, the case has been described in which the estimated execution times of the respective processes performed by a certain industrial device 30 are distinguished in the schedule screen G1, although some users may want to group the processes for the purpose of management. The receiving unit 105 of the present modification receives the operation for grouping all or some of the processes on the schedule screen G1. For example, a user selects a plurality of processes to be executed by an industrial device 30, thereby grouping the processes. For example, when grouping all the processes in the industrial device 30, the user selects the industrial device 30 that groups all the processes. Further, for example, when grouping the processes of one industrial device 30 and the processes of another industrial device 30, the user selects these processes.

Figure 18:
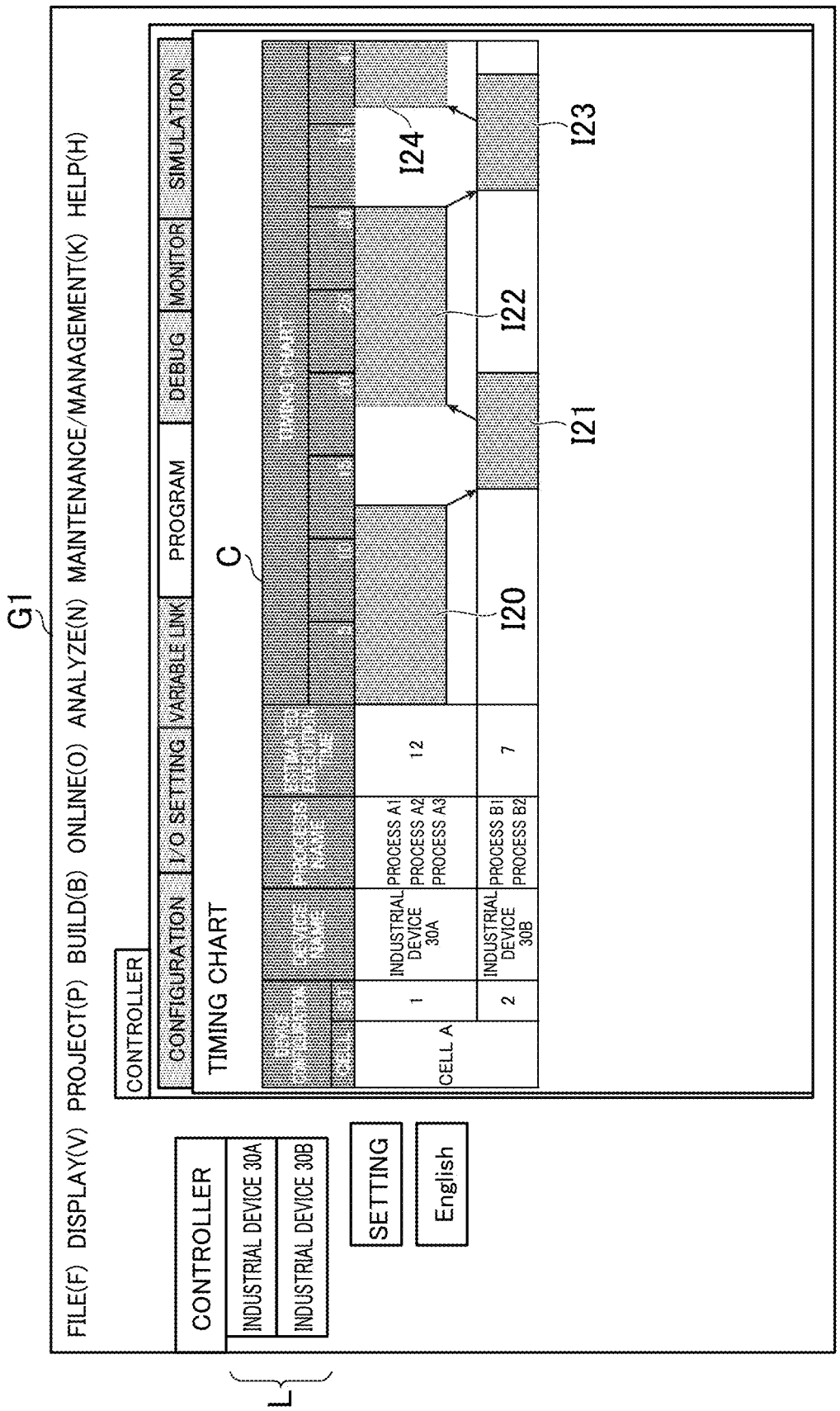
FIG. 18 is a diagram illustrating an example of the timing chart when processes are grouped.

FIG. 18 is a diagram illustrating an example of the timing chart C when the processes are grouped. As shown in FIG. 18, the display control unit 104 groups all or some of the processes based on the operation received by the receiving unit 105 and displays the processes on the schedule screen G1. The grouped processes are summarized in one process image I.

In the example of FIG. 18, the processes A1, A2, and A3 in the industrial device 30A are grouped together and displayed as process images I20, I22, and I24. The processes B1 and B2 in the industrial device 30A are grouped together and displayed as process images 121 and 123. In this manner, the processes performed in a certain industrial device 30 may be black boxed, and the estimated execution time of the entire group may be displayed.

According to the modification example (4), all or some of the processes are grouped and displayed on the schedule screen G1, and whereby the processes related to each other can be displayed in a visually clear manner, and the generation of the system program Q can be effectively supported.

Figure 19:
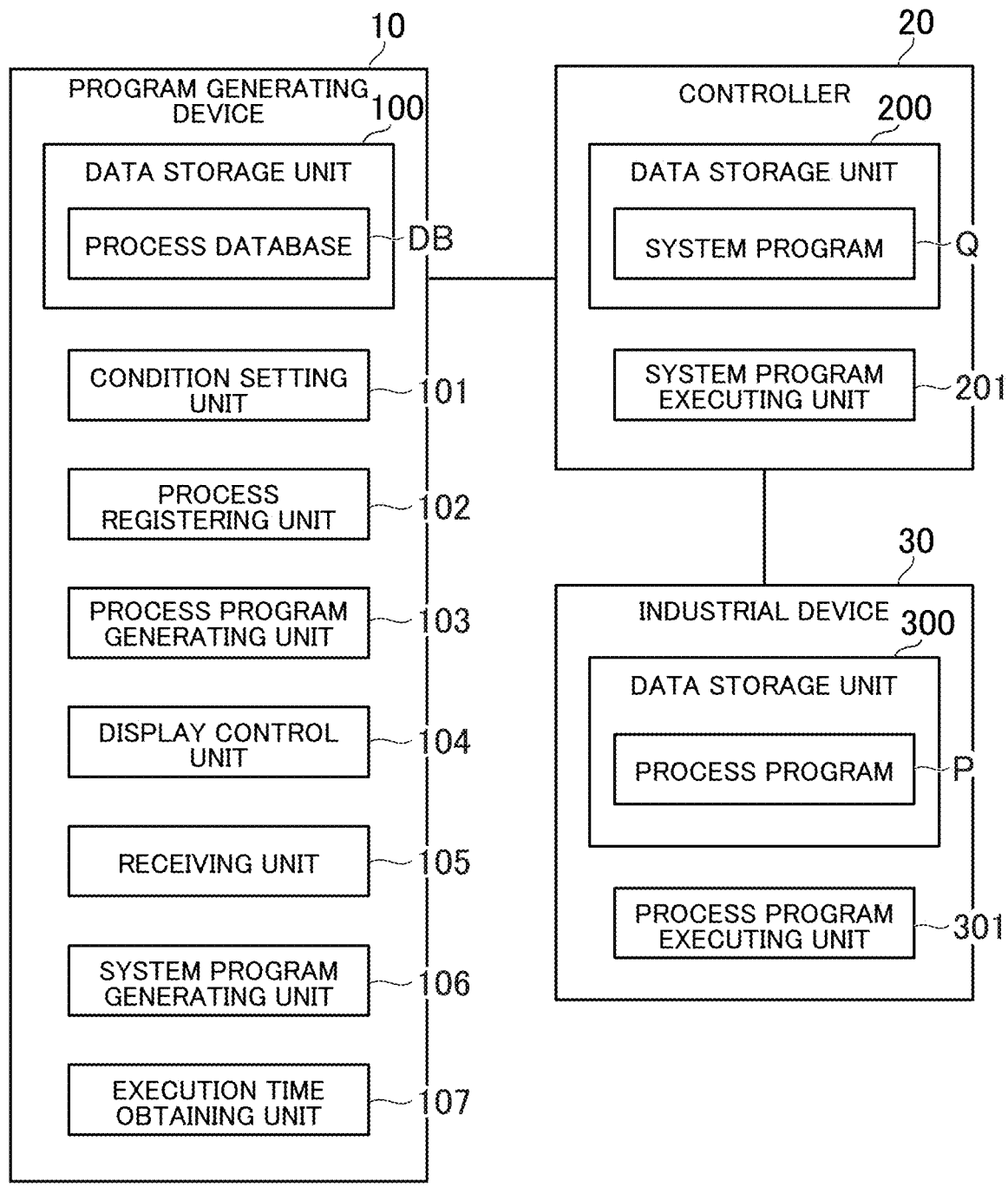
FIG. 19 is a functional block diagram of modification example (5).

(5) For example, the estimated execution time and the actual execution time may be compared and displayed. FIG. 19 is a functional block diagram of modification example (5). As shown in FIG. 19, an execution time obtaining unit 107 is implemented in the present modification. The execution time obtaining unit 107 is mainly implemented by the CPU 11.

The execution time obtaining unit 107 obtains actual execution time of each of the processes based on the execution result of the system program Q. The actual execution time is a length from the actual start time to the end time. For example, the execution time obtaining unit 107 starts the timing process after setting the start variable of the process to a predetermined value, and measures the time until the end variable of the process becomes a predetermined value. The measurement of the actual execution time may be performed in the industrial device 30. In this case, the execution time obtaining unit 107 obtains the actual execution time from the industrial device 30.

Figure 20:
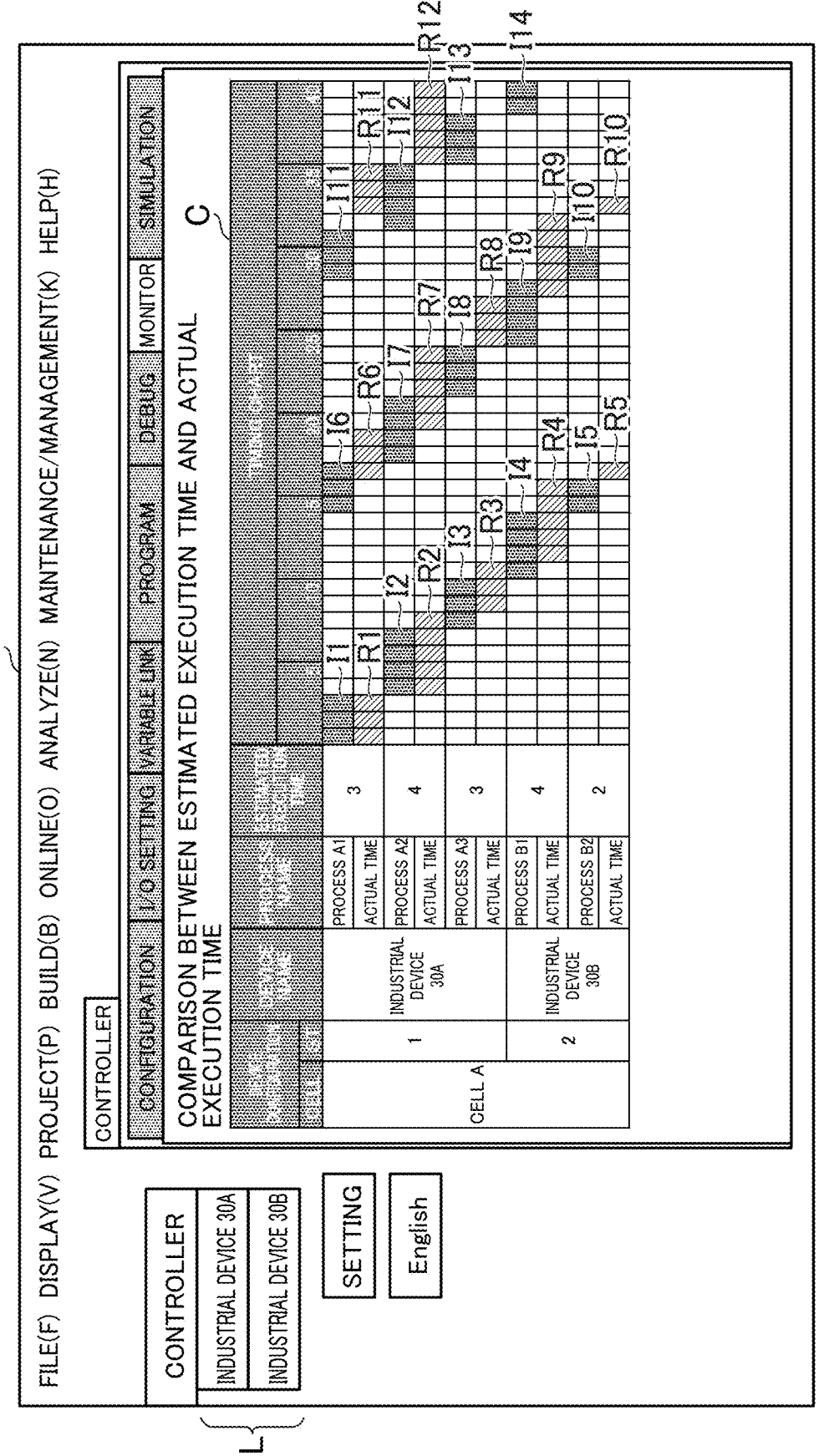
FIG. 20 is a diagram illustrating an example of a case where expected execution time and actual execution time are compared.

FIG. 20 is a diagram illustrating an example of a case where the expected execution time and the actual execution time are compared. In FIG. 20, the process images of the estimated execution time are indicated by symbols I1 to I14, and the process images of the actual execution time are indicated by symbols R1 to R12. The display control unit 104 displays the timing chart C based on the execution order received by the receiving unit 105, the names and variables of the respective processes included in the execution order, and the execution times of the respective processes. As shown in FIG. 20, in the timing chart C of the present modification, the names of the processes included in the execution order are arranged on the process axis as described in the embodiment.

In the timing chart C, the process images R1 to R12, which represent the execution time of each of the processes in a length on the timing axis perpendicular to the process axis, are arranged at substantially the same position of each process name on the process axis and in the execution order on the timing axis. The process images R1 to R12 are different from the process images I1 to I14 in that the process images R1 to R12 indicate actual execution times, and are similar to the process images I1 to I14 in other respects such as display position and length.

The example of FIG. 20 shows a case where the process image R indicating the actual execution time is displayed under the process image I indicating the estimated execution time of each process, although the process image R may be displayed above the process image I, or the process image I and the process image R may overlap with each other. In the timing chart C, the estimated execution time and the actual execution time may be displayed in a comparable manner. The timing chart for specifying the execution order and the timing chart for displaying the execution time may be the same or different.

According to modification example (5), the estimated execution time of each process is compared with the actual execution time to be displayed, which helps to grasp how much the actual operation differs from the estimation at the time of programming.

(6) Further, for example, the estimated execution time of each process may be changed by the user. As described in the embodiment, the display control unit 104 displays the estimated execution times of the respective processes on the schedule screen G1. The estimated execution time may be indicated by a numerical value or by a length of the process image I.

The receiving unit 105 receives an operation for changing the estimated execution times of the respective processes. The change operation may be any operation, such as an operation for inputting a numerical value of the expected execution time into the input form, an operation for selecting a numerical value of the estimated execution time from the pull-down menu, or an operation for changing the length of the process image I. The estimated execution time is changed to be a length corresponding to the change operation, and the display and the process information on the schedule screen G1 are also updated.

According to modification example (6), the operation of changing the estimated execution time of each of the processes is received on the schedule screen G1, which helps to easily plan the procedure in the entire industrial device.

(7) Further, for example, the above modification examples may be combined.

Further, for example, the controller 20 may store a process program P for controlling the operation of the device immediately below. Further, for example, in the timing chart C, the process axis may be omitted, and only the timing axis may be set. In this case, the process images I of the respective processes may be displayed so as to be aligned in a row. Further, for example, the process database may be stored in a computer (e.g., the server 40) other than the program generating device 10. Further, for example, the plurality of industrial devices 30 may alternately execute the processes. For example, the default variable may not be prepared. In this case, the creator may manually set a variable, or the creator may freely select a variable from a list of variables prepared in advance. Further, for example, a variable for interrupt processing may be prepared. Further, for example, information of the processes of all the industrial devices 30 may be automatically displayed on the timing chart C instead of selecting the industrial devices 30 from the list L.

Further, for example, if the start of the second cycle is later than the end of all the processes of the first cycle, the start timing of the second cycle may be automatically determined without specifying the start timing of the second cycle. In the example of FIG. 7, the start timing of the second cycle (second start timing of the process A1) may be automatically determined to be any timing after the 17th second. Further, for example, there may be one process program P for executing a plurality of processes. Further, for example, while the case has been described in which the industrial device 30 operates periodically, the periodic operation may not be particularly performed. In this case, the repetitive operation is not set. Further, for example, while the case has been described in which the program generating device 10 is a personal computer, the program generating device 10 may be implemented by another type of computer such as a server computer.

Further, for example, the above-described embodiments have been shown as specific examples, and the present invention disclosed in this specification is not limited to the configurations of these specific examples and the data storage examples themselves. Those skilled in the art may make various modifications to the disclosed embodiment with regard to, for example, the shapes and numbers of physical components, data structures, and execution orders of processing. It is to be understood that the technical scope of the invention disclosed herein encompasses such modifications. In other words, it should be understood by those skilled in the art that various modifications, combinations, sub-combinations and alterations may occur depending on design requirements and other factors insofar as they are within the scope of the appended claims or equivalents thereof. In other words, it should be understood by those skilled in the art that various modifications, combinations, sub-combinations and alterations may occur depending on design requirements and other factors insofar as they are within the scope of the appended claims or equivalents thereof.

What is claimed is:

1. A program generating device comprising:
    at least one memory that stores an engineering tool, and
    at least one processor executing the engineering tool and configured to:
    display a schedule screen, in which, for each of a plurality of processes executed in a system including a plurality of industrial devices, at least a name of a process is associated with a variable that is at least either referenced or changed in a process program representing an operation of one or more of the plurality of industrial devices and executed in the process, a plurality of names of the plurality of processes obtained from a process database that is stored as process information are included, and an execution order of the plurality of processes can be specified, the variables of each of the plurality of processes include a start variable indicating a start of execution of the process and an end variable indicating an end of execution of the process;
    receive a specification of the execution order on the schedule screen;
    generate a system program that operates each of the plurality of industrial devices in the specified execution order based on the execution order and the variable of each process included in the execution order,
    wherein when the start variable in any one of the processes is changed to a first predetermined value this process starts,
    wherein when this process ends, the end variable in this process is changed to a second predetermined value and the start variable in the next process is changed to the first predetermined value, and
    wherein the system program controls the start variable and the end variable in each of the plurality of processes so that the processes according to the execution order are sequentially executed.

2. The program generating device according to claim 1, wherein
    the at least one processor is configured to generate the system program by associating a change variable that is changed in at least one process in the execution order with the start variable of one or more other processes that are executed in conjunction with the one process so that the processes according to the execution order are sequentially executed.

3. The program generating device according to claim 2, wherein
    the at least one processor is configured to set a condition of at least one of the start variable or the change variable for a new process that is not registered in the process database; and
    the at least one processor is configured to store, in the process database, at least one of the set start variable or the set change variable as the process information in association with a name of the new process.

4. The program generating device according to claim 3, wherein
    the at least one processor is capable of setting a predetermined default variable as at least one of the start variable or the change variable and adding a variable specified by a user.

5. The program generating device according to claim 4, wherein
    the at least one processor is configured to display a series program screen in which a part corresponding to the process program can be specified in already generated series of programs,
    the at least one processor is configured to receive a specification of the part corresponding to the process program on the series program screen, and
    the at least one processor is configured to generate a new process program corresponding to the new process based on the specified part of the series of programs and at least one of the set start variable or the set change variable.

6. The program generating device according to claim 4, wherein
    the at least one processor is configured to display a timing chart as the schedule screen based on the execution order and the names and the variables of the respective processes included in the execution order,
    the names of the plurality of respective processes included in the execution order are arranged on a process axis in the timing chart, and
    a plurality of process images, which respectively indicate the execution of the plurality of processes by respective lengths on a timing axis perpendicular to the process axis, are arranged in the timing chart so that the plurality of process images are disposed at substantially same positions of the respective names on the process axis and in the execution order on the timing axis.

7. The program generating device according to claim 3, wherein
    the at least one processor is configured to display a series program screen in which a part corresponding to the process program can be specified in already generated series of programs,
    the at least one processor is configured to receive a specification of the part corresponding to the process program on the series program screen, and
    the at least one processor is configured to generate a new process program corresponding to the new process based on the specified part of the series of programs and at least one of the set start variable or the set change variable.

8. The program generating device according to claim 7, wherein
    the variable to be referenced is entered in the process database as the process information, and the process database stores a name of the process corresponding to calculation processing for outputting a result to the variable to be changed and the variable associated with the name of the process, and
    in a case where the execution order includes the process corresponding to the calculation processing, the at least one processor is configured to display a process image of a process corresponding to the calculation processing together with other process images.

9. The program generating device according to claim 7, wherein
the at least one processor is configured to obtain an actual execution time of each of the plurality of processes based on an execution result of the system program,
the at least one processor is configured to display a timing chart based on the execution order, the names and the variables of respective processes included in the execution order, and the execution time of each of the processes, and
the names of the plurality of processes included in the execution order are arranged on a process axis in the timing chart, and
a plurality of process images, which respectively indicate the execution of the plurality of processes by respective lengths on a timing axis perpendicular to the process axis, are arranged in the timing chart so that the plurality of process images are disposed at substantially same positions of the respective names on the process axis in the execution order on the timing axis.

10. The program generating device according to claim 3, wherein
the at least one processor is configured to display a timing chart as the schedule screen based on the execution order and the names and the variables of the respective processes included in the execution order,
the names of the plurality of respective processes included in the execution order are arranged on a process axis in the timing chart, and
a plurality of process images, which respectively indicate the execution of the plurality of processes by respective lengths on a timing axis perpendicular to the process axis, are arranged in the timing chart so that the plurality of process images are disposed at substantially same positions of the respective names on the process axis and in the execution order on the timing axis.

11. The program generating device according to claim 2, wherein
the at least one processor is configured to display a timing chart as the schedule screen based on the execution order and the names and the variables of the respective processes included in the execution order,
the names of the plurality of respective processes included in the execution order are arranged on a process axis in the timing chart, and
a plurality of process images, which respectively indicate the execution of the plurality of processes by respective lengths on a timing axis perpendicular to the process axis, are arranged in the timing chart so that the plurality of process images are disposed at substantially same positions of the respective names on the process axis and in the execution order on the timing axis.

12. The program generating device according to claim 11, wherein
the process information includes an estimated execution time of the process, and
the at least one processor is configured to set the length of the process image on the timing axis to a length corresponding to the estimated execution time.

13. The program generating device according to claim 11, wherein
the at least one processor is configured to receive a movement instruction as a specification of the execution order, the movement instruction for moving the process image on the timing axis in the timing chart,
the at least one processor is configured to move the process image in the timing chart based on the movement instruction, and
the at least one processor is configured to generate the system program by associating the start variable of the other process corresponding to the moved process image with the change variable of the one process corresponding to a process image disposed immediately before the other process on the timing axis.

14. The program generating device according to claim 11, wherein
the process database stores the names of the plurality of industrial devices in association with process information of a plurality of processes executed in the respective industrial device,
the at least one processor is configured to display a list of the names of the plurality of industrial devices on the schedule screen,
the at least one processor is configured to receive a selection of a name of the industrial device from the list, and
the at least one processor is configured to arrange the process images of the plurality of respective processes associated with the selected industrial device on the process axis in the timing chart.

15. The program generating device according to claim 1, wherein
the at least one processor is configured to display a table as the schedule screen based on the execution order and the processes and the variables included in the execution order, and
the names and the variables of the plurality of processes included in the execution order are arranged in the table in a column direction or a row direction.

16. The program generating device according to claim 1, wherein
the at least one processor is configured to receive an operation for grouping all or some of the plurality of processes on the schedule screen, and
the at least one processor groups all or some of the processes based on the operation and displays the grouped processes on the schedule screen.

17. The program generating device according to claim 1, wherein
the at least one processor is configured to receive a specification of repetitive operation of each of the plurality of industrial devices on the schedule screen, and
the at least one processor is configured to generate the system program that operates each industrial device with a specified repetitive operation based on the repetitive operation.

18. The program generating device according to claim 1, wherein
the process information includes estimated execution time of the process,
the at least one processor is configured to display the estimated execution time of each of the plurality of processes on the schedule screen, and
the at least one processor is configured to receive an operation for changing the estimated execution time of each process.

19. A program generating method comprising:
displaying a schedule screen, in which, for each of a plurality of processes executed in a system including a plurality of industrial devices, at least a name of a process is associated with a variable that is at least either referenced or changed in a process program representing an operation of one or more of the plurality of industrial devices and executed in the of process, a plurality of names of the plurality of processes obtained from a process database that is stored as process information are included, and an execution order of the plurality of processes can be specified; the variables of each of the plurality of processes include a start variable indicating a start of execution of the process and an end variable indicating an end of execution of the process;

receiving a specification of the execution order on the displayed schedule screen;

generating a system program that operates each of the plurality of industrial devices in the specified execution order based on the execution order and the variable of each process included in the execution order, wherein when the start variable in any one of the processes is changed to a first predetermined value, this process starts, wherein when this process ends, the end variable in this process is changed to a second predetermined value and the start variable in the next process is changed to the first predetermined value, and wherein the system program controls the start variable and the end variable in each of the plurality of processes so that the processes according to the execution order are sequentially executed.

20. A non-transitory information storage medium having stored thereon a program for causing a computer to:

display a schedule screen, in which, for each of a plurality of processes executed in a system including a plurality of industrial devices, at least a name of a process is associated with a variable that is at least either referenced or changed in a process program representing an operation of one or more of the plurality of industrial devices and executed in the process, a plurality of names of the plurality of processes obtained from a process database that is stored as process information are included, and an execution order of the plurality of processes can be specified; the variables of each of the plurality of processes include a start variable indicating a start of execution of the process and an end variable indicating an end of execution of the process;

receive a specification of the execution order on the schedule screen;

generate a system program that operates each of the plurality of industrial devices in the specified execution order based on the execution order and the variable of each process included in the execution order, wherein when the start variable in any one of the processes is changed to a first predetermined value, this process starts, wherein when this process ends, the end variable in this process is changed to a second predetermined value and the start variable in the next process is changed to the first predetermined value, and wherein the system program controls the start variable and the end variable in each of the plurality of processes so that the processes according to the execution order are sequentially executed.

* * * * *